(12) United States Patent
Warren et al.

(10) Patent No.: US 7,871,810 B2
(45) Date of Patent: Jan. 18, 2011

(54) MULTIAXIS FOCUSING MECHANISM FOR MICROARRAY ANALYSIS

(75) Inventors: Scott R. Warren, San Francisco, CA (US); Louis B. Hoff, Belmont, CA (US); Mark F. Oldham, Los Gatos, CA (US)

(73) Assignee: Life Technologies Corporation, Carlsbad, CA (US)

( * ) Notice: Subject to any disclaimer, the term of this patent is extended or adjusted under 35 U.S.C. 154(b) by 240 days.

(21) Appl. No.: 10/980,886

(22) Filed: Nov. 3, 2004
(Under 37 CFR 1.47)

(65) Prior Publication Data
US 2006/0094027 A1    May 4, 2006

(51) Int. Cl.
*C12M 1/00* (2006.01)
*G01N 15/06* (2006.01)
*G01N 21/47* (2006.01)

(52) U.S. Cl. ............... 435/283.1; 435/286.2; 435/287.2; 435/288.7; 422/68.1; 422/82.05; 422/82.08

(58) Field of Classification Search ............. None
See application file for complete search history.

(56) References Cited

U.S. PATENT DOCUMENTS

| | | | |
|---|---|---|---|
| 4,780,617 A | 10/1988 | Umatate et al. | |
| 4,948,983 A | 8/1990 | Maruyama et al. | |
| 4,962,318 A | 10/1990 | Nishi | |
| 5,493,402 A | 2/1996 | Hirukawa | |
| 5,525,808 A | 6/1996 | Irie et al. | |
| 5,578,832 A | 11/1996 | Trulson et al. | |
| 5,596,204 A | 1/1997 | Irie et al. | |
| 5,680,200 A | 10/1997 | Sugaya et al. | |
| 5,834,758 A | 11/1998 | Trulson et al. | |
| 6,198,976 B1 * | 3/2001 | Sundar et al. | 700/59 |
| 6,252,236 B1 | 6/2001 | Trulson et al. | |
| 6,335,824 B1 | 1/2002 | Overbeck | |
| 6,362,004 B1 * | 3/2002 | Noblett | 436/43 |
| 6,407,858 B1 | 6/2002 | Montagu | |
| 6,490,533 B2 * | 12/2002 | Weiner et al. | 702/27 |
| 6,970,240 B2 * | 11/2005 | Oldham et al. | 356/317 |
| 7,135,667 B2 * | 11/2006 | Oldham et al. | 250/208.1 |
| 7,499,806 B2 * | 3/2009 | Kermani et al. | 702/19 |
| 2002/0003216 A1 | 1/2002 | Kida et al. | |
| 2004/0009586 A1 * | 1/2004 | Oldham et al. | 435/287.2 |
| 2004/0038390 A1 * | 2/2004 | Boege et al. | 435/288.7 |
| 2005/0094856 A1 * | 5/2005 | Warren | 382/129 |
| 2006/0138344 A1 * | 6/2006 | Gunstream et al. | 250/459.1 |

\* cited by examiner

*Primary Examiner*—B J Forman

(57) ABSTRACT

Systems and methods for positioning a multi-featured biological array relative to a signal acquisition device. Detection of the array's positional deviation may be achieved by a calibration beam reflected from the array surface and detected by a position sensitive detector (PSD). The PSD-measured positional deviation can be transformed and used in a control loop to correct for positional variations of the array. The calibration beam and PSD may also be used to detect the array or feature boundaries, thereby allowing lateral centering or positioning of the array relative to the signal acquisition device.

43 Claims, 21 Drawing Sheets

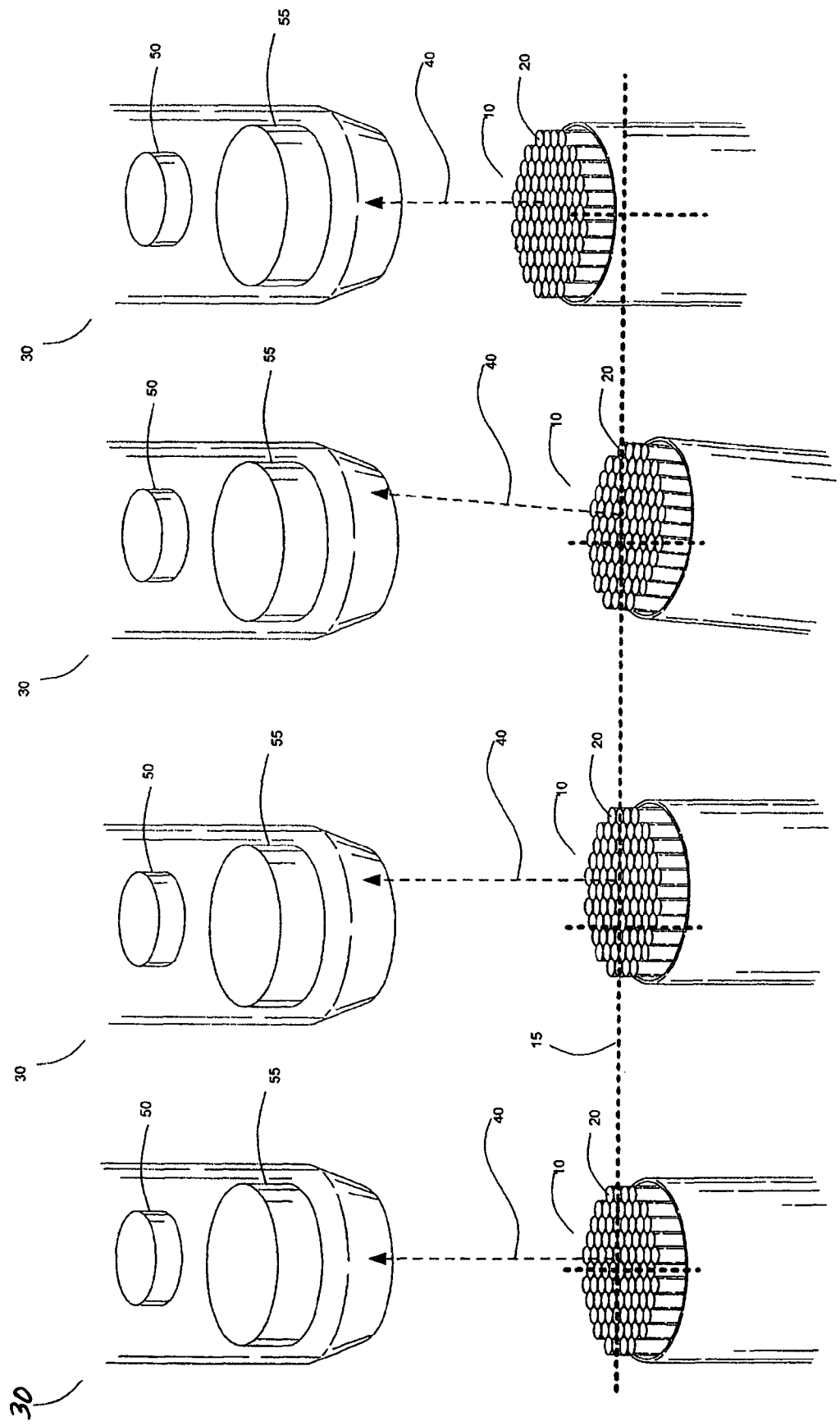

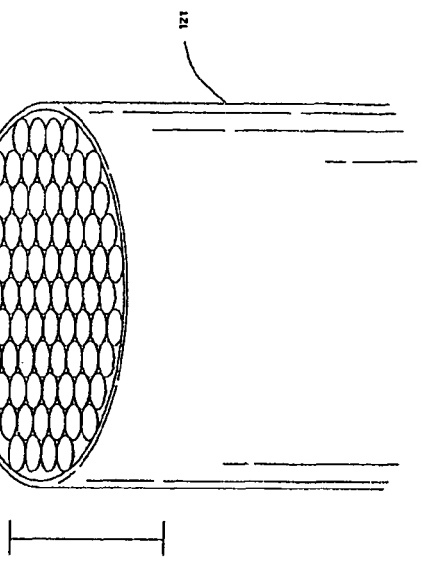
FIG. 3C
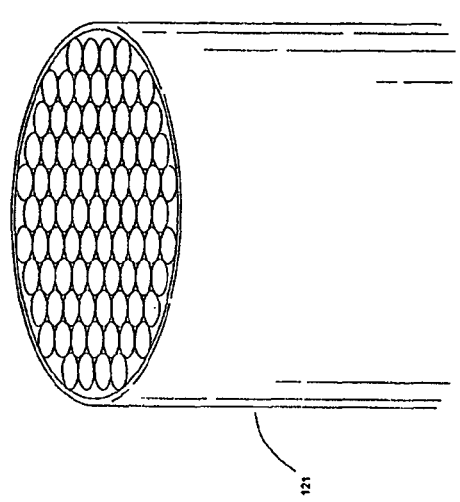
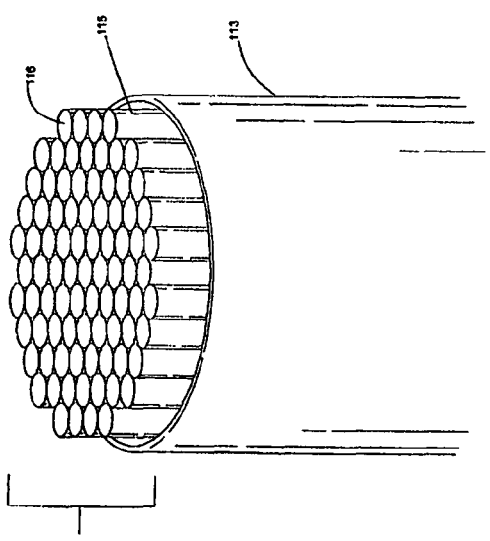
FIG. 3A
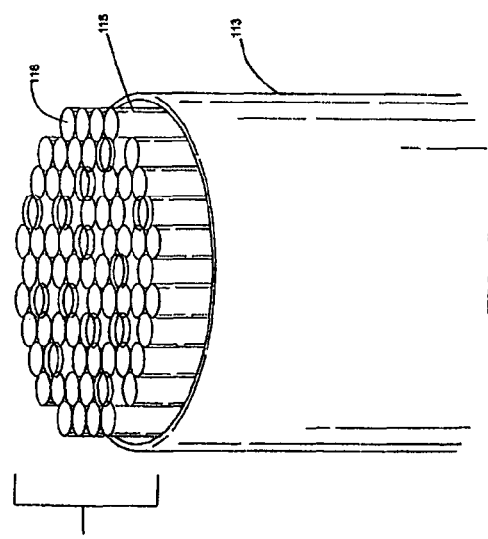
FIG. 3B

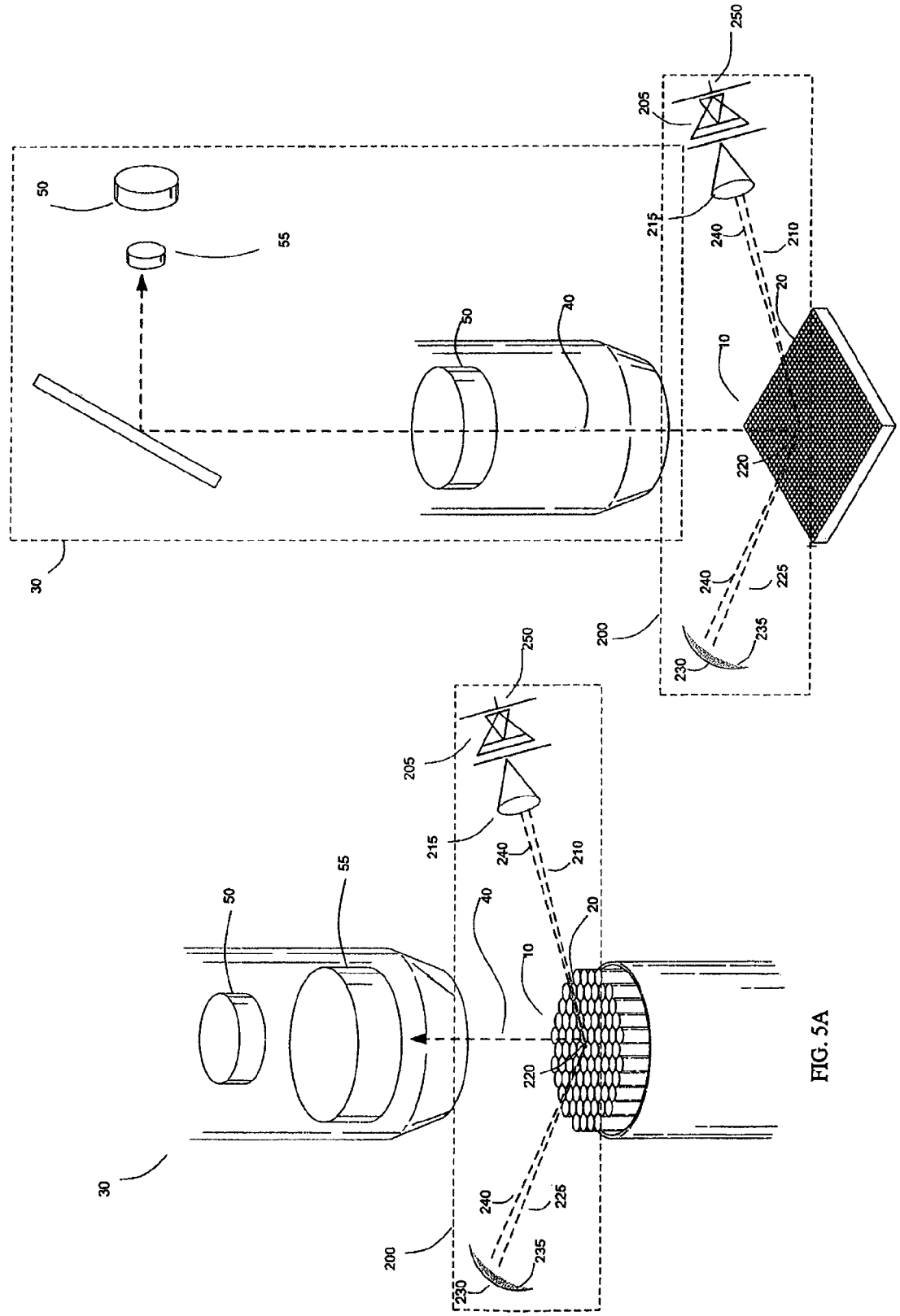

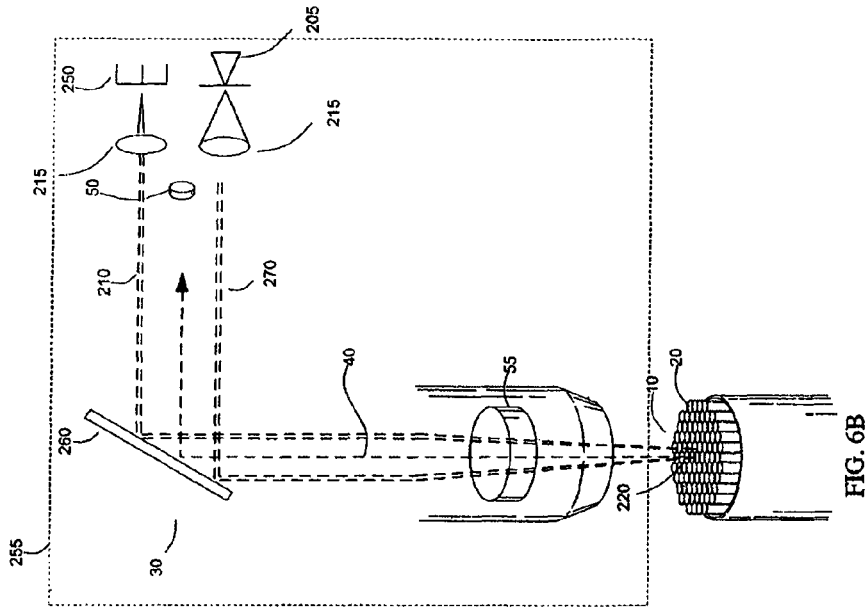
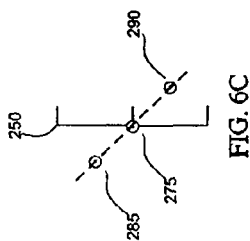
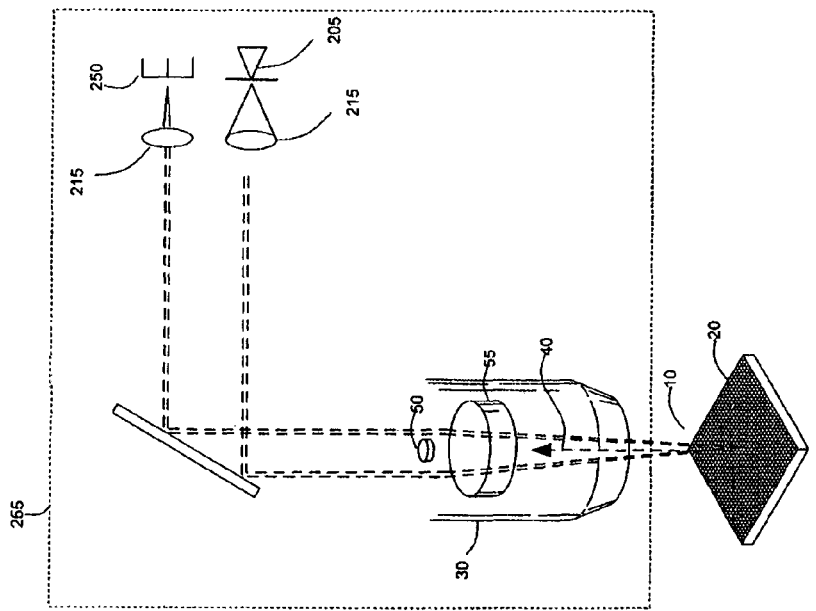

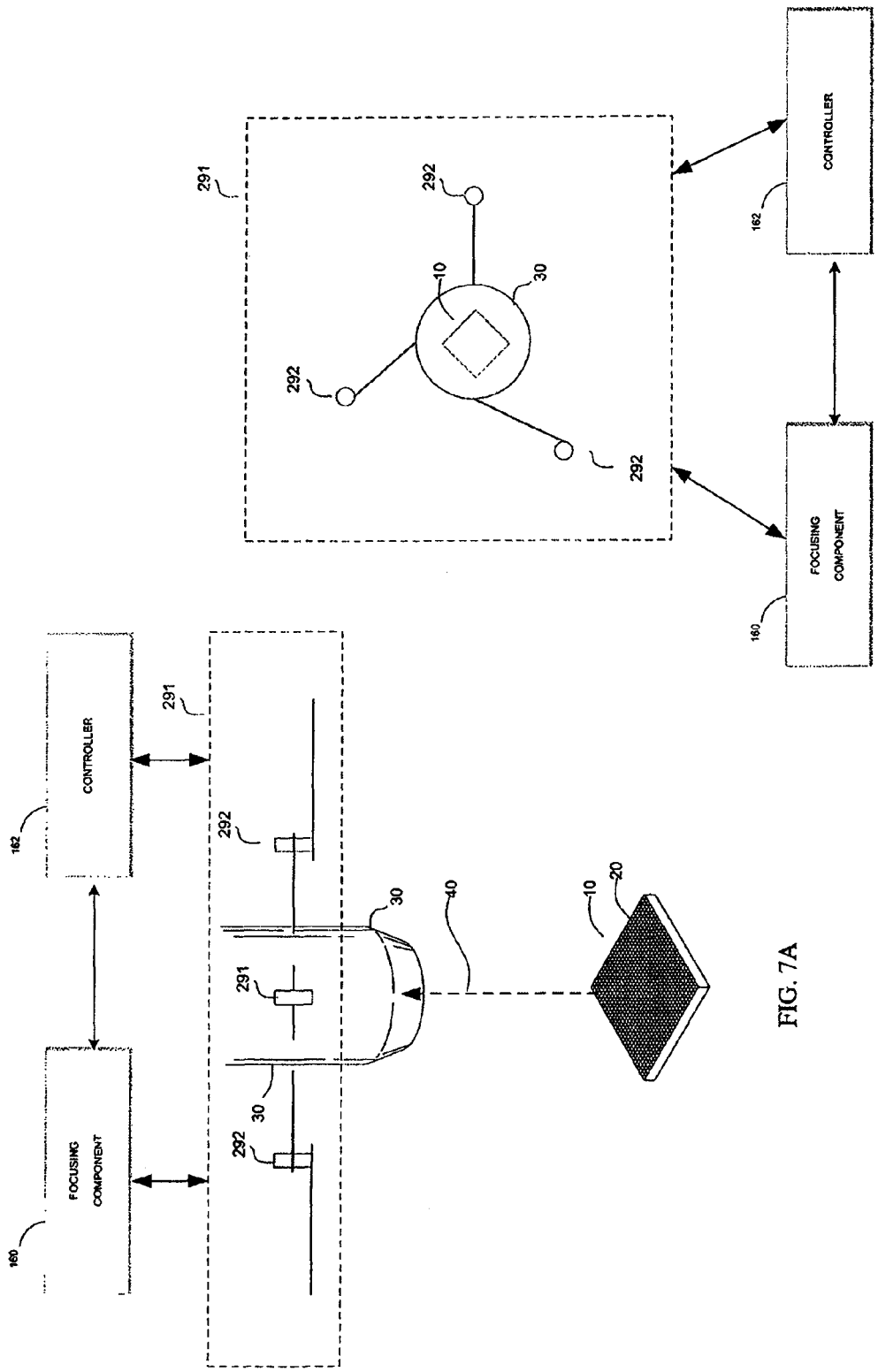

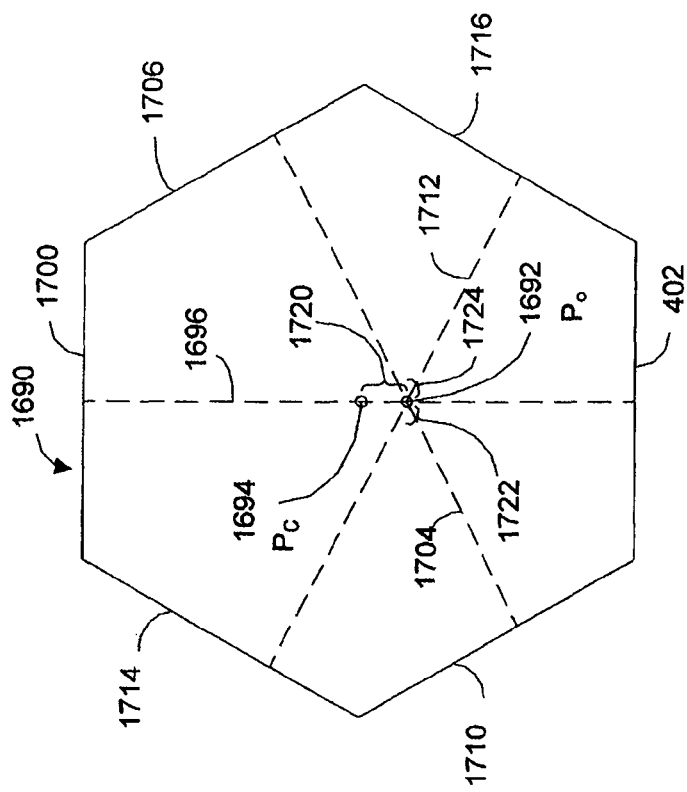
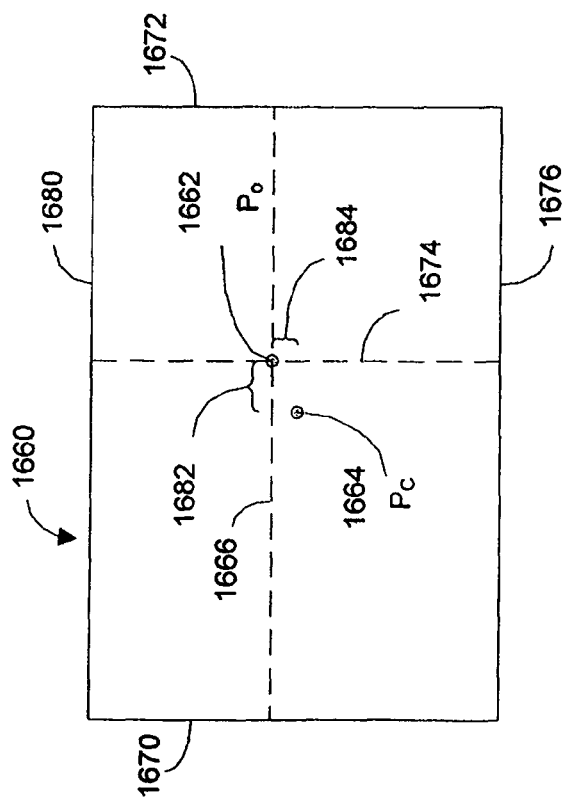
FIG. 19B
FIG. 19A

MULTIAXIS FOCUSING MECHANISM FOR MICROARRAY ANALYSIS

CROSS-REFERENCE TO RELATED APPLICATIONS

This application claims priority to U.S. Provisional Application titled "SYSTEMS AND METHODS FOR DETECTING TARGET FOCUS AND TILT ERRORS DURING GENETIC ANALYSIS," filed Nov. 3, 2003 as U.S. patent application Ser. No. 10/700,372 and converted to provisional application on Oct. 1, 2004, U.S. Provisional Application titled "SYSTEMS AND METHODS FOR CENTERING A TARGET DURING GENETIC ANALYSIS," filed Nov. 3, 2003 as U.S. patent application Ser. No. 10/700,360 and converted to provisional application on Oct. 1, 2004, and U.S. Provisional Application titled "SYSTEMS AND METHODS FOR CORRECTING TARGET FOCUS AND TILT ERRORS DURING GENETIC ANALYSIS," filed Nov. 3, 2003 as U.S. patent application Ser. No. 10/700,362 and converted to provisional application on Oct. 1, 2004, which are incorporated herein by reference.

FIELD

Biochemical analysis using arrays represents a powerful technique for detecting the presence and expression of many genes or proteins simultaneously. An array typically comprises a substrate surface containing a large number of closely packed probes each of which provide a means to selectively generate a signal when exposed to a particular sample species (e.g. DNA, RNA, protein). Discrimination and resolution of signals obtained from probe/sample hybridization generally requires precision instrumentation designed for very fine movement and measurement. During sample analysis, problems arise when performing signal acquisition due to positional deviations on or beyond the order of the feature size being observed. As an example, array analysis instrumentation routinely measures fluorescent emissions arising from closely packed nucleotide detection features on the micron ($10^{-6}$ m) scale. In such circumstances, even small positional or reference frame deviations may result in imaging and analysis problems. Deviations such as these can occur for many reasons, including mechanical tolerance limitations, focusing hysterisis, and other positioning difficulties. To overcome the aforementioned limitations of conventional analysis platforms and to address the problems associated with analyzing progressively smaller and more complex arrays, the need for improved methods for microarray position detection and compensation becomes increasingly relevant.

SUMMARY OF THE INVENTION

The present teachings relate to systems and methods for positioning a target relative to a signal acquisition frame. Detection of the target's positional deviation may be achieved through the use of a calibration beam reflected from the target surface and detected by position sensitive detectors (PSDs) thereby allowing removal or correction of focus and/or tilt errors. The PSD-measured quantities associated with these errors can be transformed into quantifiable values and used to reduce and/or compensate for positional errors during signal acquisition. The calibration beam and one or more PSDs may also be used to detect the target's edges or boundaries, thereby allowing centering or positioning of the target relative to the reference frame or signal acquisition device.

One aspect of the present teachings relates to an optical system for positional assessment and target array or surface centering and/or alignment. The system comprises a target surface or array comprising a plurality of features which emit signals on the basis of exposure to selected particles contained within a sample. The target further comprises a first and a second reflecting surface delineated by a boundary wherein the plurality of features are arranged in a selected orientation with respect to the boundary. The system further comprises an imaging device configured to acquire signals emitted by the features and identify the relative position and intensity of each acquired signal to thereby identify and/or quantify the composition of the sample. The system further comprises a positional adjustment mechanism capable of positioning the target about an optical axis. The system further comprises a calibration source configured to direct a calibration beam onto the target which is subsequently reflected from an incident point on either the first or second reflecting surfaces. The system further comprises a detector that identifies the reflected beam and outputs corresponding calibration signals. The system further comprises a controller that monitors the calibration signals and is configured to distinguish calibration signals corresponding to beam reflections arising from the first and second reflecting surfaces to thereby detect a transition point where the beam reflections transition between the first and second reflecting surfaces to identify the boundary. The controller determines the position of the detected boundary relative to the imaging device to direct the positional adjustment mechanism to position the target in a selected orientation.

In one embodiment, the positional adjustment mechanism positions the target in such a manner so as to substantially center the target and thereby improve the resolution of signals arising from the features. In one embodiment, the positioning of the target in the selected orientation using the controller improves the resolution of the signals emitted by the features. In one embodiment, the optical axis about which the target is positioned extends substantially perpendicularly to the first reflecting surface.

In one embodiment, the boundary comprises two substantially parallel sides. The target is positioned laterally along a first direction substantially perpendicular to the two substantially parallel sides to thereby provide a means to determine the positions of the two substantially parallel sides relative to the imaging device which is used to determine the position of the target along the first direction with respect to the imaging device. In one embodiment, the boundary of the first surface defines a polygon having at least two sets of substantially parallel sides such that the position of the target can be determined with respect to the at least two sets of parallel sides to thereby provide a means for determination of the orientation of the target with respect to the imaging device in at least two dimensions. In one embodiment, the boundary of the first surface defines a polygon such that the position of the target can be determined with respect to at least three sets of parallel sides to thereby provide a means for determination of the orientation of the target with respect to the imaging device in at least two dimensions.

In one embodiment, the target comprises a fiber bundle with each fiber having a terminus adapted to bind or be responsive to a specific particle. The particles may comprise nucleotide or protein molecules such as DNA RNA, or peptide fragments. In one embodiment, the particles are labeled with chemical markers that emit a signal when subjected to an excitation source. In one embodiment, the chemical markers comprise molecules that fluoresce when subjected to an excitation source of the appropriate wavelength.

In one embodiment, the positional adjustment mechanism comprises a stage upon which the target resides, and the stage further adapted to be moved along two orthogonal axes. In one embodiment, the calibration beam source comprises a laser that emits a coherent beam. In one embodiment, the laser further comprises an infrared laser. In one embodiment, the detector comprises a photosensitive detector sensitive to the laser beam.

In one embodiment, the detector is configured to detect changes in the intensity of the reflected beam providing a mechanism for boundary determination on the basis of a change in the reflected beam's intensity as the incidence point transitions between the first and second reflecting surfaces. In one embodiment, the detector comprises a CCD device a photosensitive pixel array, or a split photodiode that allows determination of the dispersion or displacement of the reflected beam to allow boundary determination on the basis of a change in the reflected beam's dispersion or displacement as the incidence point transitions between the first and second reflecting surfaces.

Another aspect of the present teachings relates to a method for positioning a target with respect to a detector, the target having a first and a second reflecting surface delineated by a boundary. The method comprises establishing an initial orientation between the target and the detector. The method further comprises directing a calibration beam onto the target which is subsequently reflected from an incident point on either the first or second reflecting surfaces. The method further comprises identifying the orientation of the reflected beam and distinguishing beam reflections arising from the first and second reflecting surfaces to thereby detect a transition point where the beam reflections transition between the first and second reflecting surfaces to thereby identify the boundary. The method further comprises moving the target in a selected orientation on the basis of the beam reflections to achieve a selected target position with respect to the detector.

In one implementation, the target is aligned in such a manner so as to substantially center or position to the target improve resolution by the detector. In one implementation, the target is aligned about an optical axis which extends substantially perpendicularly to the first reflecting surface.

In one implementation, the boundary comprises two substantially parallel sides. The target is aligned laterally along a first direction substantially perpendicular to the two substantially parallel sides to thereby allow determination of the positions of the two substantially parallel sides and provide a means to determine the position of the target along the first direction with respect to the detector. In one implementation, the boundary defines a polygon having at least two sets of substantially parallel sides such that the position of the target can be determined with respect to the at least two sets of parallel sides to thereby provide a means to determine the orientation of the target with respect to the detector in at least two dimensions. In one implementation, the boundary defines a polygon such that the position of the target can be determined with respect to at least three sets of parallel sides to provide a means for determination of the orientation of the target with respect to the detector in at least two dimensions.

In one implementation, the target comprises an array having a plurality of features from which signals emanate and are detected by the detector. In one implementation, positioning the array in the selected target position provides a means to resolve the signals emanating from the features. In one implementation, the array further comprises a fiber bundle or probe array with each feature is associated with a selected probe configured to be responsive to a specific particle type. The particles attracted by the array may comprise nucleotide or protein molecules such as DNA RNA, or peptide fragments. In one implementations the particles are labeled with chemical markers that emit a signal when subjected to an excitation source. In one implementation, the chemical markers comprise molecules that fluoresce when subjected to an excitation source of the appropriate wavelength.

In one implementation, the target resides upon a stage which is adapted to be moved laterally along two orthogonal axes to achieve the selected target position. In one implementation, the calibration beam source comprises a laser that emits a coherent beam. In one implementation, the laser comprises an infrared laser.

In one implementation, the detector senses changes in the intensity or position of the reflected beam to allow boundary determination on the basis of a change in the reflected beam's intensity or position as the incidence point transitions between the first and second reflecting surfaces. In one implementation, the dispersion or positional deviation of the reflected beam is assessed and used in boundary determination on the basis of a change in the reflected beam's dispersion or positional deviation as the incidence point transitions between the first and second reflecting surfaces. In one implementation, the detector comprises a CCD device or a photosensitive pixel array.

Yet another aspect of the present teachings relates to an optical system for positional assessment and target centering. The system comprises a target comprising a first and a second reflecting surface delineated by a boundary, the target positioned in proximity to a detector, the detector capable of resolving signals which are emitted from the target. The system further comprises a calibration source which directs a calibration beam onto the target which is subsequently reflected from an incident point on either the first or second reflecting surfaces and is detected by the detector which outputs corresponding calibration signals. The system further comprises a controller which monitors the calibration signals and is configured to identify the orientation of the target on the basis of distinguishing beam reflections arising from the first and second reflecting surfaces to thereby detect a transition point where the beam reflections transition between the first and second reflecting surfaces to thereby identify the boundary. The system further comprises a positional adjustment mechanism which moves the target in a selected orientation as directed by the controller to achieve a selected target position with respect to the detector.

In one embodiment, the target is moved in such a manner so as to substantially center or align the target with respect to the detector thereby improving target signal resolution by the detector. In one embodiment, the target is positioned about an optical axis which extends substantially perpendicularly to the first reflecting surface.

In one embodiment alignment of the target with respect to the detector compensates for focus and/or tilt deviations. In one aspect, alignment of the target is achieved by resolving tilt deviations independent of focus deviations. In another, aspect, alignment of the target is achieved by resolving focus deviations independent of tilt deviations.

In one embodiment, the boundary comprises two substantially parallel sides. The target is positioned laterally along a first direction substantially perpendicular to the two substantially parallel sides to thereby allow determination of the positions of the two substantially parallel sides and provide a means to determine the position of the target along the first direction with respect to the detector. In one embodiment, the boundary defines a polygon having at least two sets of substantially parallel sides such that the position of the target can be determined with respect to the at least two sets of parallel sides to thereby provide a means to determine the orientation of the target with respect to the detector in at least two dimensions. In one embodiment, the boundary defines a polygon such that the position of the target can be determined with respect to at least three sets of parallel sides to provide a means for determination of the orientation of the target with respect to the detector in at least two dimensions.

In one embodiment, the target comprises an array having a plurality of features from which signals emanate and are detected by the detector. In one embodiment, positioning the array in selected position or alignment provides a means to resolve the signals emanating from the features.

In various aspects, the invention further comprises systems and methods for positioning a camera target relative to a signal acquisition frame. Detection of the target's position deviation may be achieved by a calibration beam being reflected from the target surface and being detected by at least two position sensitive detectors (PSDs) to thereby allow removal of ambiguity in the target's Z-focus error from its tilt error. The PSD-measured quantities can be transformed into target control space quantities that can be used in a control loop to reduce the target position error. The calibration beam and one or more of the PSDs can also be used to detect the target's edges, thereby allowing lateral centering of the target relative to the reference frame.

In still other aspects, the invention further comprises systems and methods for positioning a camera target relative to a signal acquisition frame. Detection of the target's position deviation may be achieved by a calibration beam being reflected from the target surface and being detected by at least two position sensitive detectors (PSDs) to thereby allow removal of ambiguity in the target's Z-focus error from its tilt error. The PSD-measured quantities can be transformed into target control space quantities that can be used in a control loop to reduce the target position error. The calibration beam and one or more of the PSDs can also be used to detect the target's edges, thereby allowing lateral centering of the target relative to the reference frame.

In yet other aspects, the invention comprises systems and methods for positioning a camera target relative to a signal acquisition frame. Detection of the target's position deviation may be achieved by a calibration beam being reflected from the target surface and being detected by at least two position sensitive detectors (PSDs) to thereby allow removal of ambiguity in the target's Z-focus error from its tilt error. The PSD-measured quantities can be transformed into target control space quantities that can be used in a control loop to reduce the target position error. The calibration beam and one or more of the PSDs can also be used to detect the target's edges, thereby allowing lateral centering of the target relative to the reference frame.

BRIEF DESCRIPTION OF FIGURES

FIGS. 2A-2D illustrate exemplary positional deviations that may affect signal acquisition.

FIGS. 3A-3C illustrate various configurations of an exemplary fluorogenic bundle to be positioned in accordance with the present teachings.

FIGS. 5A-B illustrate an exemplary calibration configuration for detecting array orientation array with respect to the signal acquisition device.

FIGS. 6A-B illustrate another exemplary calibration configuration for detecting array orientation array with respect to the signal acquisition device.

FIG. 6C illustrates a split photodiode and exemplary signal registrations used in the exemplary calibration configuration shown in FIGS. 6A-B.

FIGS. 7A-B illustrate an exemplary adjustable mount configured to provide positional adjustments to the array or signal acquisition device.

FIGS. 19A-19B illustrate some exemplary array or features shapes and their corresponding array centering geometries.

DESCRIPTION OF VARIOUS EMBODIMENTS

Figure 1C:
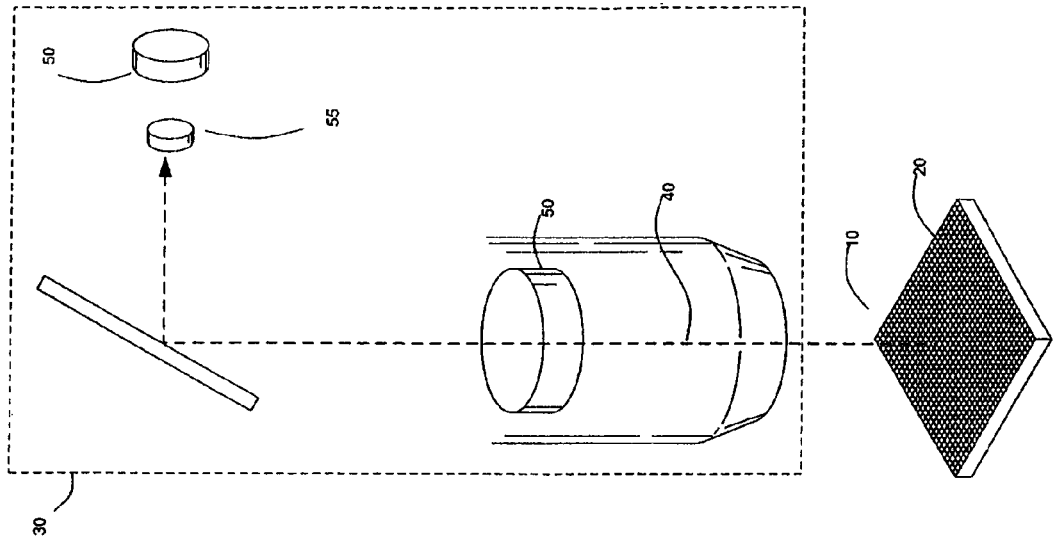
FIGS. 1A-C illustrate exemplary array and signal acquisition device configurations.

These and other aspects, advantages, and novel features of the present teachings will become apparent upon reading the following detailed description and upon reference to the accompanying drawings. In the drawings, similar elements have similar reference numerals.

The system and methods disclosed herein possess a wide range of applicability and, in particular, may be used in conjunction with visible/fluorescent label detection associated with array-based analysis methods and platforms. By way of introduction, array detection technologies encompass a number of different analytical platforms that may be used to detect the presence of one or more target species (e.g. DNA, RNA, proteins, and other biological and non-biological molecules). These technologies have the potential to selectively and simultaneously detect and/or monitor the presence and/or concentration of many hundreds, if not thousands, different molecules or species contained within one or more samples. Additionally, these technologies provide a relatively high degree of detection sensitivity that may yield both qualitative and quantitative results providing an attractive alternative to conventional analytical techniques, including gel electrophoresis and membrane blotting, as a means to perform rapid multi-component analysis in an efficient and reliable manner.

In the context of genetic analysis, array technologies may be used to provide a "global perspective" wherein the presence and/or expression of a large number of genes or proteins may be investigated substantially simultaneously. Genetic evaluation in the aforementioned manner has many applications including, but not limited to: characterization of genetic sequences, mutation and single nucleotide polymorphism (SNP) detection, particle or molecular identifications and expression analysis. Furthermore, array-based approaches may provide valuable insight into biological functions and responses in a manner that would be impractical to perform by conventional methods.

As will be appreciated by one of skill in the art, the terms "array" and "microarray" encompass any of a number of technologies which may include, by way of example: biochips, DNA chips, DNA microarrays, gene arrays, genome arrays, spotted arrays, protein arrays, fluorogenic bundles, and the like. In one aspect, an array may comprise a high density, oligonucleotide-based array which may be used to assay a large number of different genes simultaneously through selective base-pairing (e.g., A-T and G-C for DNA; A-U and G-C for RNA). Additionally, an array may be used in antibody/antigen coupling configurations format to provide other detection approaches.

In an exemplary analysis context, an array may be configured as an orderly arrangement of base sequences or other probes which serve to identify and/or quantify known and unknown sample components via complementary binding, reaction, hybridization or other known mechanisms. Arrays may be constructed in various sizes and configurations typically possessing a plurality of features with each feature generally corresponding to an area occupied by one or more probe species. To accommodate simultaneous analysis of a large number of sample components and to minimize the amount of samples required to conduct the analysis, the feature size may be relatively small (possibly on the order of 200 microns in diameter or less). Thus, in various configurations, the array is capable of containing many thousands of such features closely positioned with respect to one another.

In one embodiment, during array-based an analysis, information regarding the abundance of specific components contained within the sample may be acquired by identifying the amount or intensity of signals emanating from each feature following exposure to an experimental sample. In one aspect, one or more signals may be generated comprising fluorescent or visible light of various wavelengths which radiate from a selected feature as a result of specific interaction between components contained within the sample and selected features positioned within the array. Therefore, measuring the amount of signal emitted by each feature provides an indication of the quantity of a particular component present within the sample on the basis of knowledge of the composition and placement of features within the array. As will be appreciated by those of skill in the art, each feature may comprise one or more probes capable of selectively interacting with desired components of the sample.

In conventional data acquisition systems used in connection with array-based analysis, difficulties may arise when associating acquired signals with the probe or feature element from which they arise. Signal acquisition errors may arise as a result of positional variability or misalignment of the array during analysis and improper or insufficient signal resolution between feature areas. Errors such as these are undesirable and may lead to improper association of fluorescence or light intensities acquired during signal acquisition. The closely positioned nature of the probes, as well as, the relatively small feature size exacerbates this problem and, if left uncorrected, may result in significant degradation in the accuracy of the analysis. Furthermore, signal resolution may be confounded by focus or tilt deviations present within the detection system. For example, attempts to acquire signal information from a selected feature while the detection system is out of focus may lead to errors in quantitation of signal intensity associated with the selected feature. Similarly, tilt errors in the detection system may cause inaccuracies in signal determination.

Figure 1B:
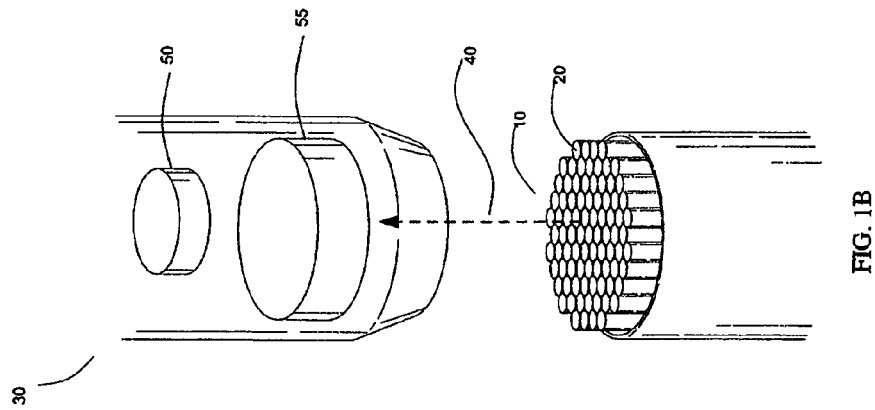
Figure 1A:
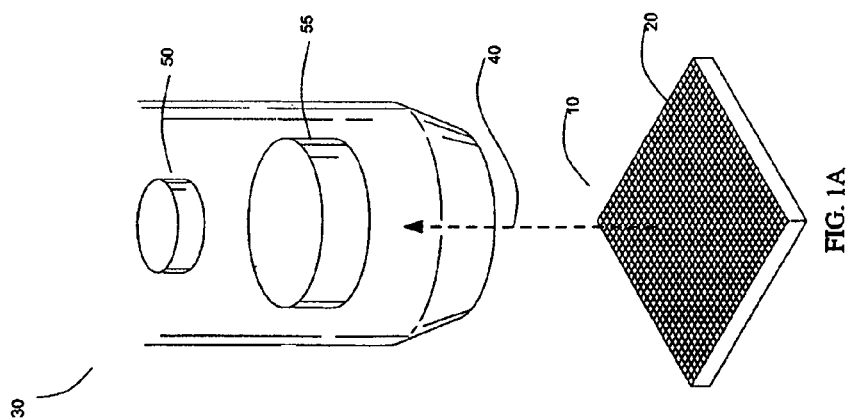

FIGS. 1A-C and 2A-2D illustrate some of the principals of data acquisition for exemplary array platforms in accordance with the present teachings. As shown in FIGS. 1A-C, an array 10 comprising a plurality of discrete features 20 is positioned in proximity to a detector 30. Each array 10 may comprise any of a number of different components or compositions designed to interrogate one or more target species present with a sample. For example, the array 10 may comprise a multi-featured substrate surface upon which a plurality of different probe species reside. As previously indicated, the probe species may comprise compositions used to identify and/or quantify nucleotide, proteins, or other components contained within the sample. Likewise, the array may be arranged as a fiber bundle or other multi-featured composite surface from which signals associated with selected probe species are transmitted wherein each fiber strand or feature is desirably associated with one or more discrete probe species whose signals are to be ascertained upon interaction with one or more selected species contained within the sample. The array may also comprise a singular substrate as in the case of a microscope slide, or similar planar material or may be a substrate material laminated to such a planar material (e.g. Coloma).

In various embodiments, the detector 30 is configured to evaluate signals 40 emanating from each feature 20 of the array 10 by finely aligning a signal capture or detection element 50 in such a position so that the signals 40 from one or more selected features 20 are acquired. The acquired signals 40 may be subsequently associated with the amount of interaction which occurred for a selected probe species and, in one aspect, calculations may be performed using the signal intensities to determine the relative presence or abundance of selected components or molecules present in the sample.

It will be appreciated that the detector 30 may acquire signals 40 for one or more features 20 on a selective basis or alternatively the signals 40 for a portion or the entirety of the array 10 may be acquired simultaneously and subsequently resolved to yield discrete signals associated with individual features 20. Consequently, in the following description of position and orientation-related signal acquisition, the manner of signal acquisition may relate to any of the aforementioned methods for detector data acquisition and to various array detector configurations. Similarly, the methods for positional assessment and adjustment to align or resolve the orientation of the array 10 with respect to the detector 30 may be applied to substantially any manner of data acquisition. Additionally, it is conceived that the present teachings may be applied to other array and/or detector configurations and, as such, those configurations shown and/or described represent examples of various possible configurations but should not be construed to limiting in scope.

In various embodiments, the detector 30 may further comprise one or more optical assemblies 55 used to direct, reflect, focus, bend or otherwise adjust the signal 40 associated with the array 20 such that they may be detected by the detection element 50. Various possible configurations of the detector 30 are shown in FIGS. 1A-C including ones which may include substantially direct optical paths as well as indirect optical paths.

FIGS. 2A-2D illustrate various alignments and positional deviations of the array 10 with respect to the detector 30 that may be desirably detected. Avoidance of positional deviations is significant in certain instances in order to avoid diminished sensitivity or improper signal registration during probe signal acquisition leading to undesirable quantitation errors. FIG. 2A is an illustration depicting appropriate alignment of the array 10 with respect to the detector 30 in a desired or optimal focal plane or position 15. When so aligned, the signal 40 arising from a selected feature element 60 may be acquired by the signal detection element 50 in such a manner so as to be resolvable from other surrounding feature elements 70. Alignment in this manner yields a resolvable signal having a magnitude that may be equated to the sample component concentration.

FIGS. 2B-2D illustrate simplified exemplary positioning deviations wherein the array 10 is displaced in various orientations with respect to the detector 30 resulting in the signal detection element 50 potentially misregistering the signal intensity associated with the selected feature element 60. In one aspect, signal misregistration may occur as a result of the array 10 or the selected feature element 60 being "out of focus" with respect to the signal detection element 50. It will be appreciated that an out of focus condition may adversely affect array analysis resulting in a loss of resolution when distinguishing signals arising from adjacent features. (including for example, undesirable signal crossover between features, loss of signal intensity, gains in signal intensity and other potentially anomalous conditions).

FIGS. 2B and 2C illustrate exemplary lateral and rotational displacements of a selected feature element 60 from the desired focal plane 15 which may result in signal misregistration as a result of problematic alignment, inappropriate tilt, or an "out of focus" condition. In such circumstances, signal misregistration may arise as a consequence of a deviation in the optical path between the features 20 and the detection element 50, or non-optimal positioning of the feature 20, array 20, detector 30, or detection element 50 with respect to one another. These undesirable circumstances may result in a selected probe species signal 40 being partially detected, missed entirely, partially obscured, or wholly obscured by surrounding signals. As shown in FIG. 2D, another potential misregistration occurrence may arise when the array 10 is displaced vertically out of the desired focal plane 15 resulting in an "out of focus" image. It will be appreciated that the aforementioned positionings of the array 20 with respect to the detector 30 are illustrative of a subset of potential positionings that may be encountered. As such, it is conceived that it is within the scope of the present teachings to detect and correct these other potential positionings.

In each of the aforementioned instances of positional displacement away from the desired focal plane 15, signals from surrounding feature elements may undesirably combine with, obscure, block, replace, or otherwise interrupt the detector's ability to resolve the signal 40 arising from the selected feature element 60. Such misregistration problems may obscure the boundaries between features creating difficulties in resolving the signals emanating from adjacent features which may not be easily distinguished even through subsequent software interpolation techniques. It will be appreciated that the diminutive size and density of features within a typical array is such that these positional deviations are particularly troublesome when attempting to resolve the individual signals arising from particular features or probes. In some instances, a positional deviation may lead to inappropriate probe-signal associations if left uncorrected. Additionally, one or more signals may crossover spatially with respect to one another presenting potential difficulties in signal resolution.

In various embodiments, the present teachings provide a mechanism to identify and correct for positional deviations such as those described above whereby each signal acquired by the detector 30 accurately reflects the feature element or probe 60 from which the signal arose with respect to position, magnitude and/or intensity. In one aspect, the present teachings may be used to actively identify and correct the array position with respect to the signal detection element 50 during analysis and signal acquisition. Additionally, the present teachings may be used to assess the orientation of the array 10 during analysis and subsequently compensate for positional deviations which might otherwise lead to signal misregistration. The present teachings, further describe mechanisms by which the array's position may be evaluated prior to and during analysis to provide a mechanism to maintain an appropriate array position and orientation thereby improving signal acquisition and resolution. Other benefits and implementations of the positional evaluation and correction scheme will be disclosed in greater detail hereinbelow.

The following description details various aspects and embodiments of a system and methods for positional assessment and correction. As will be appreciated by one of skill in the art, the following description may be applied to a number of different optical systems requiring precision alignment and target recognition. In particular, the system and methods described herein may be applied to array analysis instrumentation wherein high-density probe generated-signals may be resolved by ascertaining the position and orientation of an array upon which a plurality of probes reside. Furthermore, the methods described herein may be used to preemptively correct positional deviations associated with array placement to aid in correcting for focus and tilt in the optical path improving signal resolution during data acquisition. Additionally it is conceived that the methods described herein may be adapted for use during post-processing operations to compensate for focus, tilt, or positioning deviations encountered during analysis.

As described above, these teachings are not limited to a particular class or type of array and may be used in conjunction with numerous analytical platforms. It will be further appreciated that substitution of the components described herein may be readily performed to accommodate different implementations or configurations of signal acquisition instrumentation. For example, the previously described signal detection element 50 may comprise a split photodiode, charge coupled device (CCD), camera, photosensitive pixel array, position sensitive detector (PSD) or other suitable component for acquiring signals generated by the probes. Likewise, the probe-generated signals 40 need not necessarily be limited to only fluorescent or visible light emissions and may comprise other types of signals which may be acquired by the detector 30.

FIGS. 3A-3C illustrate additional exemplary deviations which may affect focusing with respect to the signal detection element 50. In FIG. 3A an exemplary fiber bundle 113 is illustrated wherein a plurality of signal-generating fibers 115 are arranged in proximity to one another. In one aspect, each fiber 115 is fabricated in a manner so as to provide a support surface 116 for a probe construct which acts in conjunction with a target species to generate a signal which is subsequently detected by the detector. The fibers 115 may be surface coated with the probe by various known chemistries or alternatively a probe coated bead or other suitable substrate may be used in connection with the fiber to direct the signal as desired.

As previously described, the size of each fiber 115 may be relatively small in order to accommodate grouping together of a relatively large number of fibers 115 to be used during sample analysis. In general, it is desirable to fabricate the fiber bundle 113 such that the end surfaces 116 of the fibers 115 form a relatively uniform bundle surface 117. The uniform bundle surface 117 aids in signal recognition by the detector 30 and helps to improve discrete signal resolution for each probe species.

In another aspect, the fiber bundle surface may deviate from perfect uniformity and contain various discontinuities across one or more fibers or features. Such a fiber bundle may present analysis difficulties as there may be various degrees of offset between each fiber in the fiber bundle as shown by way of example in FIG. 3B. The present teachings address this type of alignment variability and provide means to correct for its presence as will be described in greater detail hereinbelow. FIG. 3C further illustrates another form of offset wherein two fiber bundles (or groups of fibers) 121 may be displaced with respect to one another. As with internal fiber orientation and positional deviations, the present teachings provide mechanisms to assess and correct for such occurrences thereby improving the ability to resolve high density signals arising from relatively small and/or closely packed features 20.

The aforementioned description of fiber bundle positional deviations represent but a few of the many different types of possible alignment deviations which may be encountered during analysis. Other platform and system deviations which may occur include, by way of example, focus (Z axis) motor hysteresis error, position or tilt discrepancies, surface uniformity anomalies, focus calibration deviations, and thermal drift effects. It will be appreciated that the system and methods described herein may be readily adapted to accommodate other types of positional and orientational deviations as well as other types of array designs. Additionally, the present teachings may be utilized in other contexts outside of the scope of arrays to address other problems in which positional and orientational variability may affect data acquisition and analysis from relatively small feature sizes.

To illustrate how such errors may be significant with respect to the feature size being measured, an exemplary error profile for an exemplary array signal detection system is considered. In one embodiment, the target comprises a bundle of fluorogenic substrate fibers whose tips or features collectively define a target surface. Alternatively, the target may comprise an array, such as that utilized by the Applied Biosystems 1700 analysis platform or Affymetrix microarray analysis platform, comprising a surface upon which a plurality of probes are positioned and from which fluorescent, visible, or radioactive signals emanate.

In an exemplary system, exemplary deviations resulting from Z focus hysteresis may arise and equate to approximately 0.3 µm, tilt error deviations equating to approximately 0.9 µm, and surface "roughness" or imperfects equating to approximately 0.5 µm. Such variances add in quadrature to yield a combined/random error of approximately 1.05 µm. The signal detection system may also utilize a focusing algorithm imparting calibration errors on the order of approximately 0.5 µm. Thus, in the exemplary error profile, a combined focus and target-related error may be on the order of approximately 1.57 µm. This combined error may further approach the fiber diameter or feature dimension. Such errors may be problematic when the signals emanating from each tip or feature are measured and distinguished from one another. The present teachings disclosed herein provide a mechanism to detect and/or correct for such errors, reducing or accounting for the overall positional deviation associated with each feature to improve the accuracy of target positioning with respect to the signal detection system 100.

From the foregoing, it should be appreciated that in order to effectively resolve the features of the target (for example, the fiber tip diameter in the µm order of magnitude); such features preferably should not deviate from their optimal optical orientations by substantially more than the approximate feature dimension size. In various embodiments, it may be desirable for such deviations to be maintained to even more stringent tolerances. That is, when a particular feature on the target deviates significantly from its optimal position ("out of focus") a reduced quality result may be obtained. Reduced quality results may comprise diminished detected signal magnitude, improper feature registration or signal association, signal "spillover" between adjacent features, or other undesirable effects which may result in difficulties or errors when quantitating and distinguishing the signals associated with each feature. In various embodiments, the feature may be out of focus due to a target tilt (where one part may be in focus, but other parts may be out of focus), a Z-shift (where substantially entire target may be out of focus), or any combination thereof. The present teachings allow such deviations to be detected and corrected as necessary to achieve an overall focus within a specified accuracy.

Figure 4:
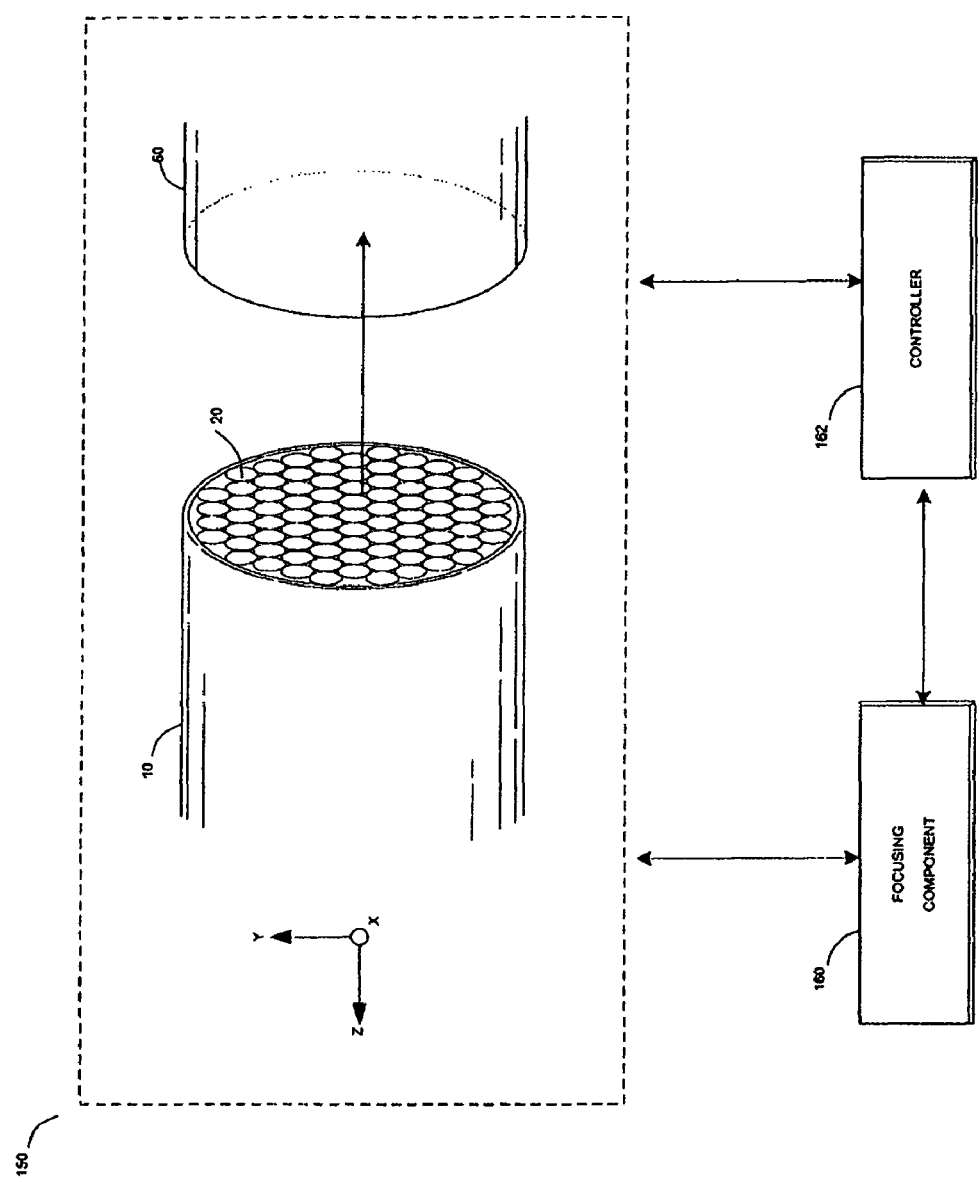
FIG. 4 illustrates a signal detection system adapted to position an array relative to a signal acquisition reference frame.

FIG. 4 illustrates a functional diagram of a sample processing system 150 for signal resolution wherein signals 40 originating from the various features 20 of the array 10 are detected by the signal detection element 50 and a controller 162 and focusing component 160 are utilized to evaluate and direct positioning of the array 10 with respect to the signal detection element 50. The controller 162 and focusing component 160 provide a mechanism by which to detect the orientation of the array 10 relative to the signal detection element 50 and to finely position the array 10. Furthermore, the sample processing system 150 can be configured to compensate for positioning, tilt, and/or focus deviations to improve signal detection and quantitation as will be described in greater detail hereinbelow.

In the context of array-based analysis, the sample processing system 150 may comprise an array reader or data acquisition device designed to receive an array or other analytical component upon which a plurality of probes or feature elements are arranged in a known order and from which one or more signals emanate. Examples of array readers may include instrumentation used in connection with evaluating probe signals originating from nucleotide or protein/peptide-based arrays, as well as, arrays or multi-featured platforms designed to assess other biological and non-biological compounds and elements.

In one aspect, each feature 20 of the array 10 may be regarded as the "optical object" of the sample processing system 150 and is desirably oriented in such a manner so as to direct signals 40 emanating from at least one feature 20 towards the signal detection element 50. It will be appreciated that the signals 40 may be directed towards the signal detection element 50 either directly or indirectly (e.g., via mirrors, diffraction gratings, lenses or other means). The feature 20 may further comprise any of a number of areas or objects regarded as an optical target from which signals are desirably identified and resolved. In various embodiments, the feature 20 may comprise a portion of a hybridization-based nucleotide detection platform wherein a plurality of nucleotide probes reside on a substrate (e.g., glass, silicon wafer, fiber bundle, Nylon substrate Coloma, etc.) and from which various signals (e.g., visible or fluorescent light) are emitted based on selective hybridization between the probes and constituent molecules present in a sample undergoing analysis.

In certain embodiments, the array 10 may be mounted on a movable stage that allows movement of the array 10 relative to the signal detection element 50 in a manner described below in greater detail. The signal detection element 50 captures or acquires an image, representation or sampling of the signals originating form the feature 20. As previously described and in various embodiments, the signal detection component 50 may include, by way of example, a CCD, a photographic film element, a split photodiode, position sensitive detector (PSD), or other signal-sensitive devices.

Although the signal detection component 50 does not specifically illustrate optical elements, it will be understood that the image of a selected feature(s) 20 or signals arising therefrom are registered by the signal detection element 50. Focusing of the signals originating from the selected features(s) 20 may be achieved through the use of an adjustable-focus optical element(s), or by positioning the array 10 with respect to a fixed focus optical element(s), or by a combination(s) thereof.

In general, it is desirable to achieve a certain positioning of the feature 20 relative to the signal detection element 50 to improve signal registration and/or accuracy. In various embodiments, this positioning is achieved when the feature 20 is at a proper focal length (e.g. along the Z axis) and plane (e.g. shown along the X/Y axis) with respect to the plane defined by the signal detection element 50. It will be understood that other configurations of the array(s) 10/feature(s) 20 and/or the signal detection element 50 may be utilized in the optical system. For example, the array 10 and/or feature surface 20 as well as the signal detection element 50 may be curved, non-uniform, and/or uneven in various respects with the sample processing system 150 configured to accommodate such characteristics. The concepts of detecting and correcting for the positional deviations described herein may also be adapted and applied to these configurations without departing from the spirit of the present teachings.

FIGS. 5A-B illustrate exemplary configurations of the present teachings that provide focus coordination, control, and positional assessment of selected features 20 of the array 10. In this configuration, a positional assessment mechanism 200 operates substantially independently of the optical path of the detector 50. Thus, the positional assessment mechanism 200 may be positioned substantially orthogonal to, below or at various angles with respect to the focusing elements or lenses 55 used in connection with the detector 50. In various embodiments, the positional assessment mechanism 200 is further associated with the focusing component 160 and provides the controller 162 with information that may be resolved to automatically or semi-automatically position the array 10 and/or detector 30 so as to achieve a desired focus, tilt, positioning, and/or alignment within the sample processing system 150. Details of exemplary methods for achieving automatic focus and positional adjustment are described in greater detail hereinbelow.

The positional assessment mechanism 200 comprises a light or emissions source 205 (e.g. laser diode) used to generate emissions 210 that may be directed towards the array 10. The emissions 210 may be visible light, fluorescent light, near infrared light, or the like and may be desirably configured as a different wavelength from that of the emissions 40 emanating from the features 20 of the array 10. Configured in this manner, positional assessment may occur substantially simultaneously with the signal acquisition for each feature 20 without interfering with the analysis (as a result of emissions crosstalk, bleed, etc). In one aspect, one or more lenses 215 may be used in connection with the emissions source 205 to focus or direct the emissions 210 in a desired manner. While shown as a single lens 215, it will be appreciated that more than one lens can be used, for example, to independently focus and direct emissions 210 arising from an excitation source and/or return emissions arising from the features 20 of the array 10. In one aspect, one or more lenses may be used to correct/compensate for optical characteristics such as astigmatisms that may be associated with the emissions source 205 (such as may be the case for a laser diode). Additionally, one or more lenses may be used in connection with different image, feature, and/or array sizes as desired. Such use of lenses may include focusing the emissions 210 so as to impinge upon the array 10 at a desired position 220 with a nominal selected focal point.

A reflected emission 225 is produced by the aforementioned configuration which is redirected towards a reflective element 230. In various embodiments, the reflective element 230 comprises an at least partially spherical mirror or surface 235 capable of at least partially reflecting the emissions 210 based on its positioning with respect to the emissions source 205 and the array 10. The curvature of the at least partially spherical surface 235 may be configured such that the radius of curvature of the at least partially spherical surface 235 has a radius of curvature substantially equal to its distance from the point of impingement 220 on the array 10.

Based on the configuration and positioning of the at least partially spherical surface 235, returned emissions 240 from the at least partially spherical surface 235 are directed back to the approximate point of impingement 220 on the array 10 along a similar path from which it came. Thereafter, the returned emissions 240 are re-directed from the array 10 and towards an emission detector 250. The emission detector 250 may comprise a number of different components capable of identifying the returned emissions 220. In one aspect, the emission detector 250 comprises a split photodiode, two or more discrete photodiodes, Charge Coupled Device (CCD-based) technologies, Complementary Metal Oxide Semiconductor (CMOS-based) technologies, N-Channel Metal Oxide Semiconductor (NMOS-based) area detector technologies, linear detectors, position sensitive detectors (PSDs), and other suitable technologies.

Furthermore, the returned emissions 240 may be focused by the least one lens 215 prior to encountering the emission detector 250. Additionally, a beamsplitter may be interposed along the emissions path so as to align the emissions 210 and reflected emissions 210 as desired. In one aspect, use of the beamsplitter 255 provides a mechanism to adjust or compensate for the distance traveled along the emissions path and allows the emissions source 205 and emission detector 250 to be located in proximity to or substantially adjacent with respect to one another.

It will be appreciated that the aforementioned configuration and position of the emissions source 205, reflective element 230, and emission detector 250 with respect to the array 10 may be used to ascertain and provide desired focusing of the emissions 40 directed towards the detector 50. In one aspect, this configuration is substantially unaffected by angular changes of the array 10 that would otherwise be observed in the optical path of the emissions 210, 225, 240. Furthermore, it will be appreciated that decoupling of focus and tilt components of the positional assessment is desirable to improve the ability to align and position the array 10. When configured in this manner, the positional assessment mechanism 200 may be used to monitor and/or maintain a desired focus position of the array 10.

Such a configuration may also be used to determine the tilt of a selected focal plane including the aforementioned desired or optimal focal plane or position 15. For example, the tilt of the focal plane associated with the array 10 may be determined by acquiring approximately three measurements at different positions on about the array 10. This information may be further utilized by the controller 162 to adjust the tilt of the array 10. In another embodiment, the amount of tilt between the array 10 and the detector 30 may be determined using a tilt detector configuration comprising replacing the spherical mirror 230 with a substantially flat mirror. From the foregoing it will be appreciated that the system of the present teachings represents an improvement over conventional autofocusing systems in which tilt and focus cannot be independently determined by providing mechanisms for decoupling these two optical characteristics.

Figure 5C:
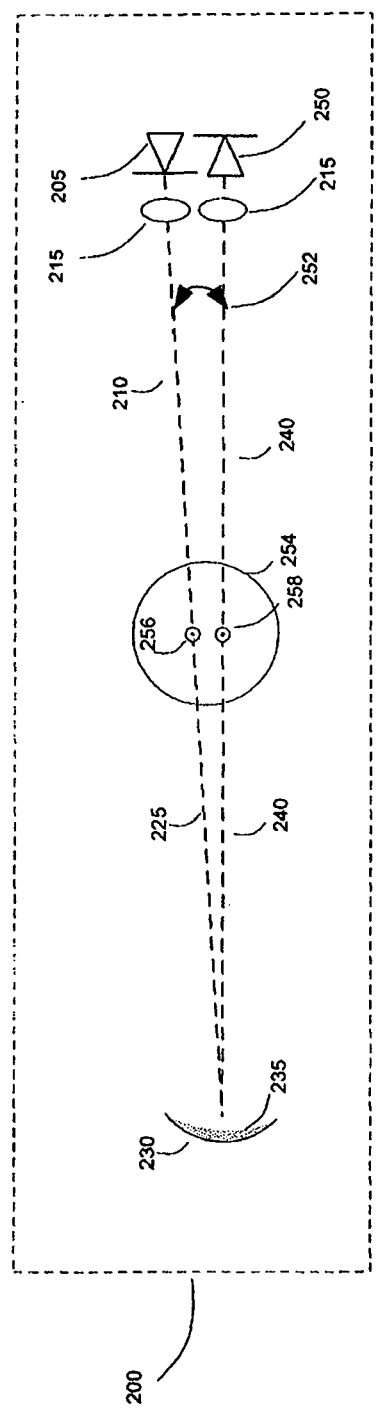
FIGS. 5C-D illustrate another view of the exemplary calibration configuration of FIGS. 5A-B for detecting array orientation array with respect to the signal acquisition device.

FIG. 5C further illustrates the positional assessment mechanism 200 from another view. As previously described emissions source 205 and emission detector 250 may be located in proximity to or substantially adjacent to one another with the source emission 210 being reflected as returned emissions 240 from the at least partially spherical surface 235. The observed angle 252 can be reduced, minimized, or eliminated completely through the use of the aforementioned beamsplitter and the emissions 210, 240 aligned or focused through the use of one or more lenses 215. An objective area 254 shown corresponds to the surface view of the array 10 for which the angular position and focus are to be ascertained with impingement points 256, 258 located where the emissions 250 are reflected from the surface of the array 10. The emissions source 205 may further comprise a laser diode and the emission detector 210 a split photodiode configured to be responsive to the wavelength of the emissions source 205.

Figure 5D:
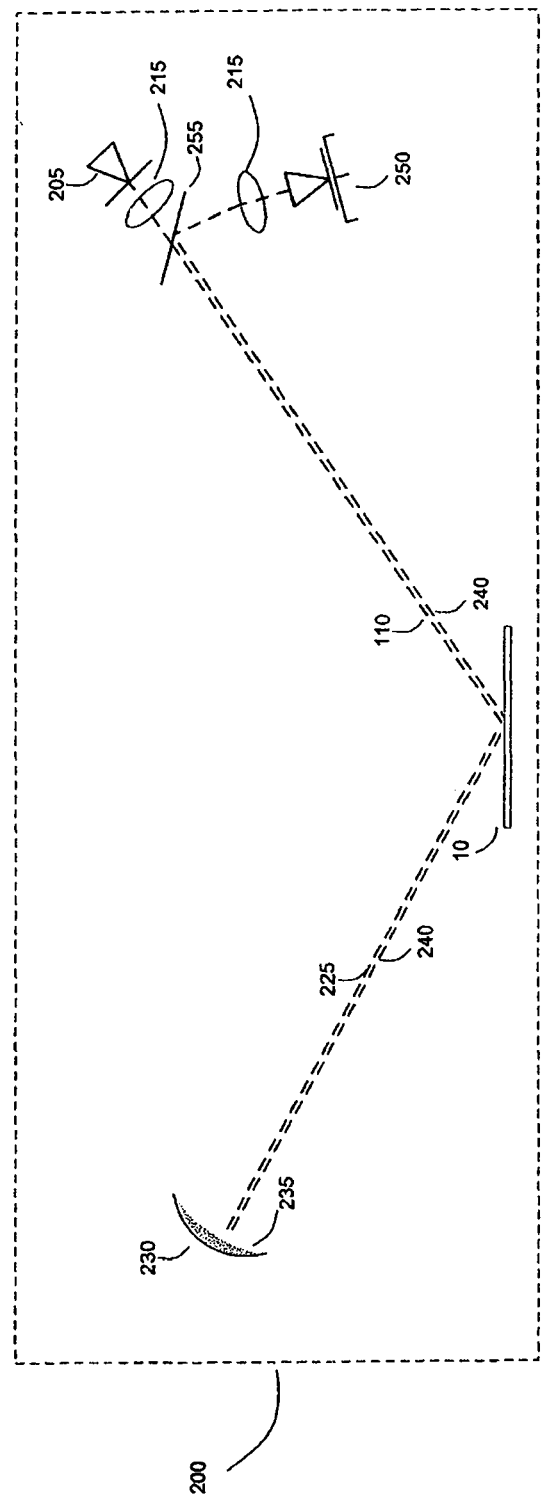

FIG. 5D illustrates the positional assessment mechanism 200 from still another view with a modified configuration. Here the beamsplitter 255 is positioned in such a manner so as to allow the reflected emissions 240 to be directed towards the emission detector 250 and angularly offset from the source emission 210 originating from the emissions source 205. As with other configurations, deflection of the reflected emissions 240 from an expected position associated with the emissions detector 250 may be used to ascertain the alignment and positioning of the array 10. The alignment and positional information provided by the emission detector 250 may further be used to provide the aforementioned focusing component 160 and controller 162 with feedback useful in obtaining a desired position of the array 10 through mechanical alignment as will be described in FIGS. 7A-B below.

FIGS. 6A-B illustrate another configuration of a positional assessment mechanism 255 configured to operate along a similar optical path as the detector 30. Such an implementation may be achieved through the use of the emissions source 205 which projects emissions 210 towards the array 10 and may include a reflector 260 such as a beamsplitter or dichrolic. The emissions source 205 further comprises a collimated beam source including for example a laser or laser diode. The emissions 210 directed towards the reflector 260 may further pass through an objective lens 265 associated with the detector 30. In such an instance, the emissions 210 may pass through one side of the objective 265, reflect off a selected region or feature 220 of the array 10 and returned through the opposite side of the objective 265. Thereafter, the emissions 210 may reflect of the reflector 260 and directed towards the emission detector 250 which may be configured as a split photodiode having two or more emissions detecting elements.

In this configuration, as the objective 265 moves with respect to the selected region 220 of the array 10 from the desired focal point, the focus on the emission detector 250 may be altered. For example, movement of the objective 265 with respect to the emission detector 250 may result in the focal point of the return emission 270 residing either in front of or behind the emission detector 250. When using a spit photodiode, as shown in FIG. 6C an image 275 generated by the return emission 270 along a nominal focus line may result in the image 275 residing at the approximate center 280 of the split photodiode 250. As the image 275 generated by the return emission 270 is brought in and out of focus with respect to the split photodiode 250 the image 275 may differentially impinge one or the other portions of the photodiode 250 providing a means to detect the focal alignment of the detector 30 with respect to the array 10. For example, when the objective is below the nominal focus plane of the image may appear below and behind 285 the center 280 of the photodiode 250. In an analogous manner, when the objective is above the nominal focus plane, the image will be in front of and above 290 the center 280 of the photodiode 250. As with the previously disclosed configuration illustrated in FIGS. 5A-B, the configuration shown in FIGS. 6A-B may be used to provide a positional assessment mechanism 255 unaffected by angular changes deviations between the array and the optical path.

Conventional autofocus systems have been described that acquire one or more images of a feature area and determine focus on the basis of image processing software. These systems are typically unable to accommodate tilt determinations and suffer from slow performance and inaccuracies. Conversely, the present teachings provide a more rapid and efficient means to identify such optical characteristics and represent an attractive alternative to other less flexible approaches. Another significant feature of the positional assessment mechanism 200 is its ability to be used in connection with a "dynamic" autofocusing system in which the autofocus position can be monitored in real time for use in scanning applications where the focus point changes with position.

In accordance with the aforementioned illustrations shown in FIGS. 5-6, tilt detection associated with positioning of the array 10 with respect to the detector 30 or components thereof can be achieved in such a manner so as to be substantially independent of focus. Similarly, focus detection associated with positioning of the array 10 with respect to the detector 30 or components thereof can be achieved in such a manner so as to be substantially independent of tilt. In certain embodiments, focus independent of tilt may be achieved using a lens 215 having properties of infinite focus that may be combined with an infinity corrected objective associated with the detector 30. In such a configuration, movement or change in the position of the reflected emissions 210 with respect to the detector 30 may be detected and arise for example from focus changes (e.g. z axis), which are substantially independent of changes in tilt of the array 10 with respect to the detector 30.

In one aspect, various configurations of the array 10 detection system as described above will provide a path of the reflected emissions 210 that will pass through substantially the same position (with respect to a plane of the objective or detector) regardless of focus. Thus, in various embodiments, reflected emissions 210 arising from the rear of the objective to the lens 210 may not necessarily be parallel to the main optical axis. Additionally, in various embodiments, tilt detection substantially independent of focus may be achieved through imaging of a focal plane associated with an infinity corrected objective. With respect to the plane of the objective, the optical path may move with the tilt of the array plane, with the path from the plane of the objective to lens 210 collimated and substantially parallel to the source emissions 210 and the principal optical axis.

FIGS. 7A-B illustrate an exemplary adjustable mount 291 associated with the aforementioned focusing component 160 and controller 162. The adjustable mount 291 may be configured to position the detector 30 or portions and lenses thereof to move to obtain a selected position, focus, and/or tilt such that signals 40 from the features 20 of the array 10 may be acquired by the detector 30 in a desired manner. In one aspect, such positioning of the detector 30 desirably improves the signal acquisition characteristics of the detector 30 and avoids the aforementioned undesirable characteristics arising from positional deviations and anomalies between the array 10 and the detector 30. While the exemplary adjustable mount 291 is depicted as positioning the detector 30, it will be appreciated that the array 10 or platform upon which the array 10 resides may be configured to be moveable with respect to the detector 30 with positional control directed by the exemplary adjustable mount 291 associated with the aforementioned focusing component 160 and controller 162.

In one aspect, the adjustable mount 291 comprises a multi-axis adjustable mount, for example, a three point adjustable mount, wherein positional adjustments are provided by one or more actuators 292. The actuators 292 may further comprise piezos, motors, piezomotors, or other types of known actuators. The adjustable mount 291 may be configured to be responsive to control signals or instructions provided by the focusing component 160 and/or controller 162 such that the adjustable mount 291 provides positional adjustment to the detector 30 as desired. Additional details for effectuating positioning of the detector 30 with respect to the array 10 will be described in greater detail hereinbelow.

In one aspect, tilt adjustment and positioning can be effectuated for one or more axis of the array 10, detector 30, and/or associated optical path using the aforementioned adjustable mount 291 and corresponding feedback and control elements. Tilt adjustment and positioning may further be directed substantially independently of focus corrections or adjustments made by the adjustable mount 291 and corresponding feedback and control elements. For example, the adjustable mount 291 and corresponding feedback and control elements may be configured to introduce two dimensional shifts or movements (e.g. X and/or Y axis) with additional three dimensional shifts or movements (e.g. Z axis) as desired. Any of these mechanisms can be implemented to effectuate movement and positioning of the array 10 and/or various components of the optical/detector path. In certain embodiments, Z axis associated movement and positioning can be accomplished solely within the optical path without necessarily moving all the elements associated with the optical path.

Figure 8A:
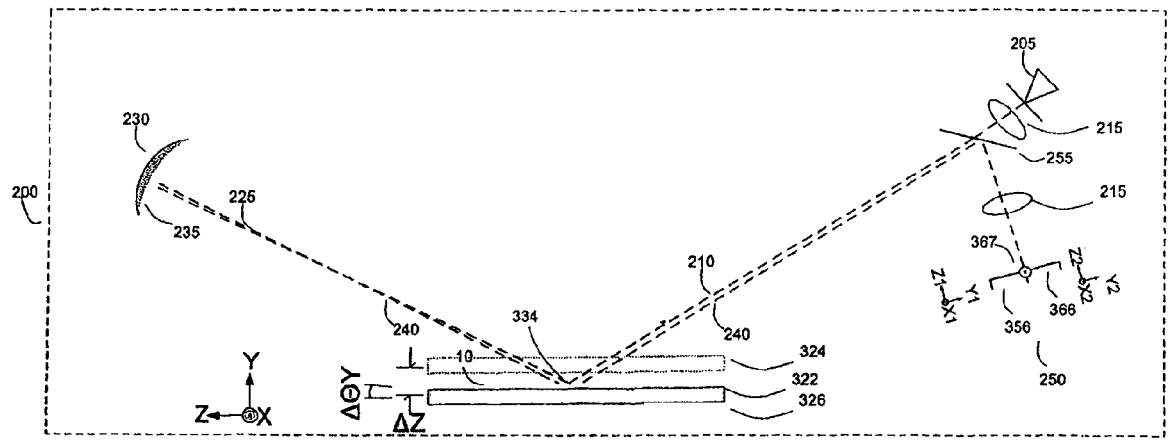
FIGS. 8A-8C illustrate an exemplary calibration process wherein the array surface is positioned in a desired manner relative to the signal acquisition reference frame of the detector.
Figure 8B:
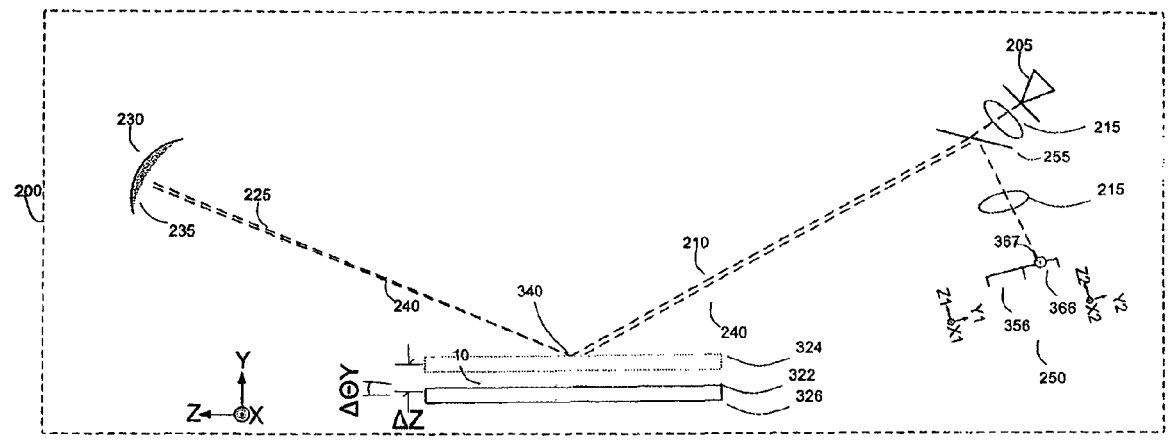
Figure 8C:
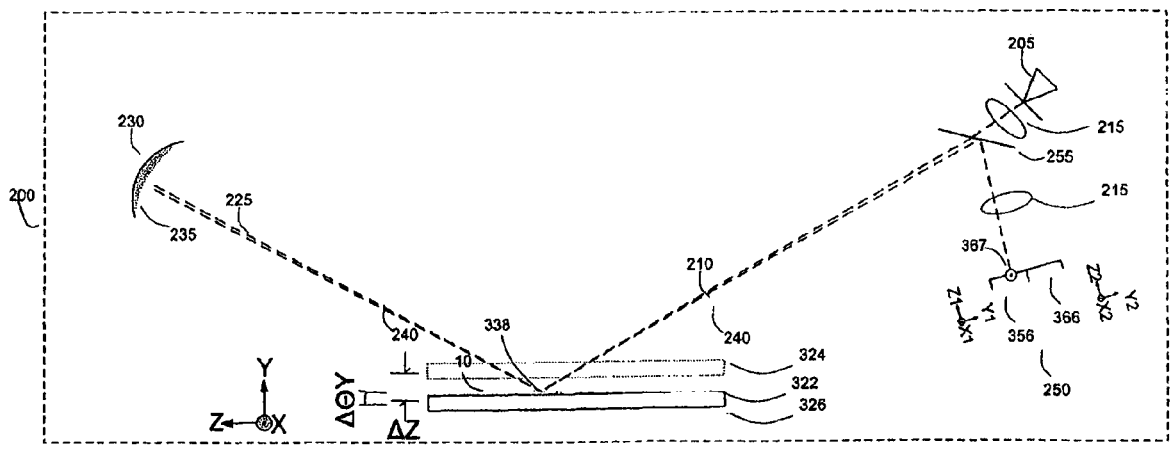

FIGS. 8A-C illustrate various exemplary positionings of the array 10 with respect to the detector 30 that may be ascertained by the positional assessment mechanism 255 of the present teachings. As shown in the Figures, the array 10 is depicted as being in a desirable or optimal position 322, a Z-shifted position 324, and a tilted position 326. Of course, the array 10 could be in any combination of the Z-shift and tilted positions, but each "mode" of deviation is considered separately for clarity. As previously described, the signal detection system comprises components that can be configured to direct emissions 210 to the array 10. In certain embodiments, the orientation of the emissions 210 is substantially fixed relative to the array 10. In other embodiments, the emissions 210 orientation with respect to the array 10 may be adjusted with sufficient accuracy and reproducibility so as to be useful for detecting the target position deviations.

As previously described, the reflective element 230 may be used to redirect those emissions 225 reflected off the array 10 along the indicated path so as to impinge upon one or more emissions detectors 250. The construction of the reflective element 230 is such that as the array 10 deviates from the optimal or desired position 322 the resultant reflected emissions 240 similarly deviate from the path that would be encountered if the array 10 had been in the desired or optimal position 322. As will be described in greater detail hereinbelow, the one or more emissions detectors 250 may be positioned in such a manner so as to be able to ascertain the positional deviations of the array 10 based upon the relative impingement of reflected emissions upon the one or more emissions detectors 250.

As shown by way of example, the array 10 is in the desired or optimal position 322, the emissions 210 impinge on the array 10 at a point 334 and are reflected in generally in a specular manner to yield the reflected emissions 225 shown in FIG. 8A. Similarly, when the array 10 is in the Z-shifted position 324, the emissions 210 impinge on the array 10 at a point 340 and yield reflected emissions 225 shown in FIG. 8B. Similarly, when the array 10 is in the tilted position 326, the emissions 210 impinge on the array 10 at a point 338, which may or may not be the same as the point 334, and yields reflected emissions 225 shown in FIG. 8C.

It will be appreciated that the term "emissions" (such as usage for emissions 210 and emissions source 205) is not intended to be limited to the visible spectrum as generally understood. Other forms of electromagnetic energy, such as infrared, ultraviolet, and other radiation types may therefore be used without departing from the spirit of the present teachings. The emissions 210 may also originate from a source independent of that used during signal detection processes associated with the array 10 (e.g. probe detection, hybridization detection, or array signal detection). In another aspect, the emissions 210 may originate from substantially the same source as that used during signal detection processes associated with the array 10 (e.g. using the same excitation source as that used for generating probe emission signals). As previously described, the configuration of the emission source may also be such that emissions 210 are directed through substantially the same optical path (or a portion thereof) as that used during array signal acquisition using the array excitation source. In various embodiments, the system may also be configured for use with an auto-focusing excitation or emissions source including for example an auto-focus laser source.

In various embodiments, the target position deviation detection system may be configured to include a first position sensitive detector or portion thereof (PSD) 356 and a second PSD or portion thereof 366 positioned at selected locations with respect to the array 10 and the detector 30. In one aspect, the first and second PSDs may comprise substantially the same PSD and delineate different detection regions within the PSD. Furthermore, the first and second PSDs may comprise a split photodiode configuration 250 as previously described above. In the exemplary detection system configuration, use of the aforementioned beam splitter 255 may be adapted to split and direct the emissions 210 and reflected emissions 240 such that at least a portion of the reflected emissions 240 impinge upon the first and/or second PSDs 356, 366 based upon the relative positioning and alignment of the array 10. In certain embodiments, the beam splitter 255 may comprises a semi-transparent mirror that possesses partially transmissive and partially reflective properties. It will be appreciated, however, that any numerous other means of splitting/directing/redirecting the emissions 210 and reflected emissions 240 may be employed without departing from the spirit of the present teachings.

The array-reflected emissions 240 shown in FIG. 8A thus impinge on the first PSD 356 and/or the second PSD 366. Similarly, the array-reflected emissions 240 impinge on the first PSD 356 and/or second PSD 366 shown in FIG. 8B. Similarly, the array-reflected emissions 240 impinge on the first PSD 356 and/or the second PSD 366 shown in FIG. 8C. In each instance, an exemplary impingement reference 367 is shown representing the principal localization or concentration of reflected emissions 240. It will be appreciated, however, that the reflected emissions 240 may comprise a "spread" or concentration of emissions that do not necessarily impinge solely on the first or second PSD 356, 366 but rather impinge on both the first and second PSD 356, 366. The deviation or offset of the emissions spread or concentration for a given array alignment or positioning may however be ascertainable relative to a preferred or desired alignment or positioning of the array 10.

From the foregoing description, it will be appreciated that the use of two PSDs or portions may be used to facilitate array positional determination in the manner described. In certain embodiments, the signal detection system comprises two independent PSDs located at substantially fixed locations with respect to the signal acquisition frame. In other embodiments, a single PSD may be adapted to be moved between a first and a second location with sufficient accuracy and reproducibility to provide similar capability as that of the two-PSD system without departing from the spirit of the present teachings.

In certain embodiments, the target-reflected emission's PSD position corresponding to the target's optimal position 322 is predetermined. As such, any deviation of a detected emission's position (from that corresponding to the optimal or desired position) on a given PSD represents a position deviation of the array 10. As previously mentioned the array 10 may deviate from the optimal or desired position 322 in any combination of Z-shift and tilt. Thus, a given array positional deviation from the optimal position may include the effects of Z-shift and the tilt. One aspect of the present teachings relates to utilizing the detected emission impingement positions on the PSD(s) to ascertain the Z-shift effect uncoupled from the tilt effect, thereby allowing corrections to compensate for the two deviation modes separately. The methodology for such a technique is described below in greater detail.

In one aspect, the desired or optimal position 322 of the array may be depicted on an X-Y plane, with the first and second PSDs 356 and 366 are depicted to be in X1-Y1 and X2-Y2 planes, respectively. Furthermore, the emissions 210 and the reflected emissions 240 may define a plane that is coplanar with the Y-Z, Y1-Z1, and Y2-Z2 planes. As such, the Y1 deviation on the first PSD 356 and the Y2 deviation on the second PSD 366 may be configured to represent the Z-shift ($\Delta Z$), tilt of the Y axis ($\Delta \theta_Y$), or the combination thereof the array 10 with respect to the optimal or desired position 322.

It will be understood that the array 10 may also deviate so as to tilt the X-axis ($\Delta \theta_X$), alone, or in conjunction with any of the above-described combination of the Z-shift and the Y-tilt. The X-tilt will be manifested in deviations of detected light along the X1 and X2 axes. Thus, the concept of uncoupling the $\Delta Z$ and the $\Delta \theta_Y$ via the Y1 and Y2 measurements previously mentioned above can be naturally extended such that the target deviation can be uncoupled to $\Delta Z$, $\Delta \theta_X$, and $\Delta \theta_Y$ via the measurements of X1, Y1, X2, Y2 of the first and second PSDs 356 and 366. It will also be understood that the array's and the first and second PSD's coordinate systems illustrated orientations are but one of many possible selections, and is in no way meant to limit the scope of the present teachings. Additionally other coordinate system conventions may be used without the loss of generality or departing from the spirit of the present teachings.

In one aspect, the deviation of the array 10 may be depicted to be in $\Delta Z$ and $\Delta \theta_Y$ (and also $\Delta \theta_X$ by extension) for clarity of illustrating the interdependence of the Z-shift and the tilt on the reflected light. The target may also deviate laterally (along the X-Y plane) with respect to the signal acquisition frame. The lateral deviation of the target, however, generally does not alter the geometry of target-reflected light.

The two PSDs described above may be utilized to determine the position of the target with respect to the reference frame. Such determination can be made during a "run" condition on a sample-bearing surface of the array 10. In one aspect, a calibration of the array's position relative to the reference frame or desired positioning/alignment of the array 10 allows such run-time position determination to be made in an efficient manner. Subsequent Figures will illustrate exemplary calibration methods that may be performed prior to runtime that need not necessarily be repeated during the run.

Figure 9:
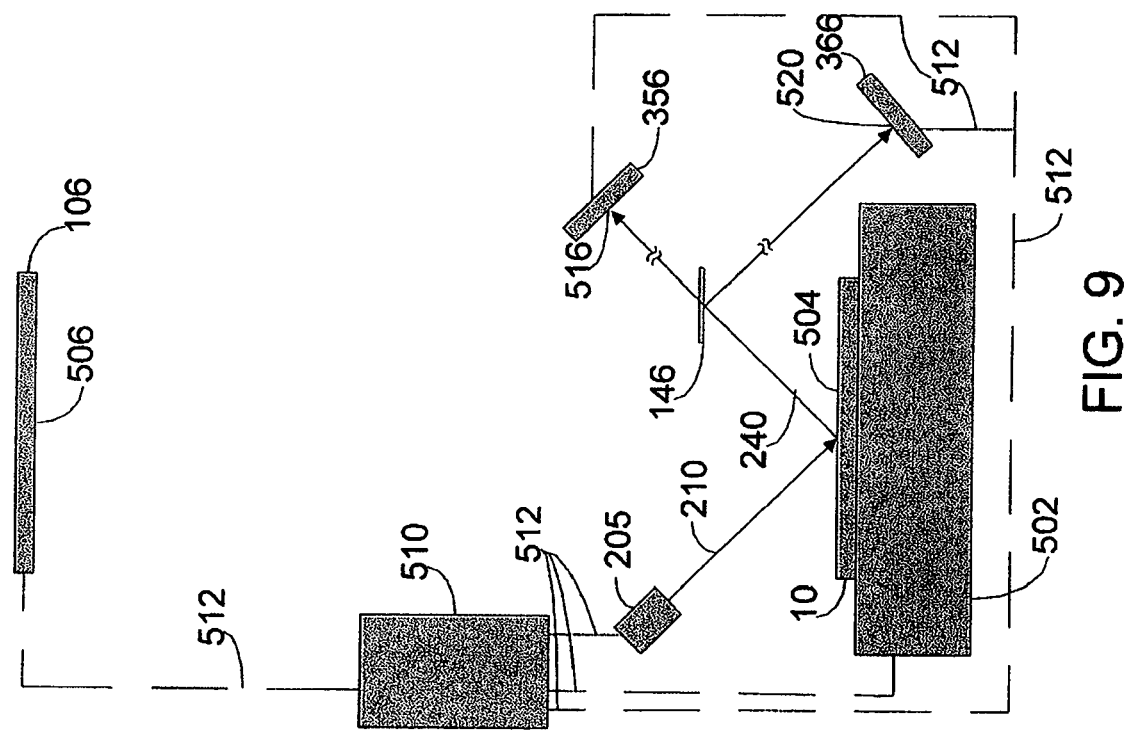
FIG. 9 illustrates an exemplary calibration configuration wherein an array surface is positioned in a desired orientation relative to the signal acquisition reference frame of the detector.

FIG. 9 illustrates an alternative arrangement of the array 10 relative to the detector as indicated by reference frame 106. As with other embodiments, the array 10 and/or detector 30 may be positioned and/or aligned by controlled movements in a manner exemplified below. In certain embodiments, the array 10 may be mounted on a stage 502. The stage 502 is positioned relative to the reference frame 106 via a relative positioning mechanism 510. The positioning mechanism 510 allows the reference frame 106, stage 502, emissions source 205, and the first and second PSDs 356, 366 to be positioned relative to each other with a specified level of accuracy. Positioning mechanisms for the components are indicated by dashed lines 512, and may be achieved, by way of example, by precision mechanical interconnection, by having the various components' orientations surveyed relative to each other, or by some combination thereof. It will be appreciated that various possible methods may be employed to achieve positioning of the components without departing from the spirit of the present teachings.

In certain embodiments, the array 10 is dimensioned such that its first surface 504 is in a substantially known or ascertainable orientation with respect to the stage 502. Thus, the first surface 504 is in a substantially known or ascertainable orientation with respect to a first surface of the reference frame 106. Such array 10 may include a specially fabricated calibration target or one or more positioning target(s) having known dimensions and other characteristics that make them suitable for calibration purposes.

Using the array 10 mounted in the foregoing manner, an emission 210 from the emissions source 205 reflecting from the first surface 504 of the array 10 results in the reflected emission 240 being substantially registered at registration points or area 516 and 520 on the first and second PSDs 356, 366, respectively. For a given substantially fixed and known orientation of the components (indicated by the dashed lines 512), the registration points or areas 516 and 520 are substantially unique and generally correspond to the orientation of the first surface 504. Thus, by varying the orientation of the first surface 504 and determining the corresponding values from the first and second PSDs 356, 366, one can calibrate the responses of the PSDs for future use.

In various embodiments such calibration may be performed prior to a data acquisition run. The calibration may further be performed upon setup or initialization of the optical system, prior to a selected data acquisition run, during a selected data acquisition run or any combination thereof. Additionally, some independent mechanism for verifying the relative array-reference frame orientation may be utilized. Such mechanisms may include, for example, precision surveying of the components to ascertain the relative positions of the various components with specified precision.

Figure 10:
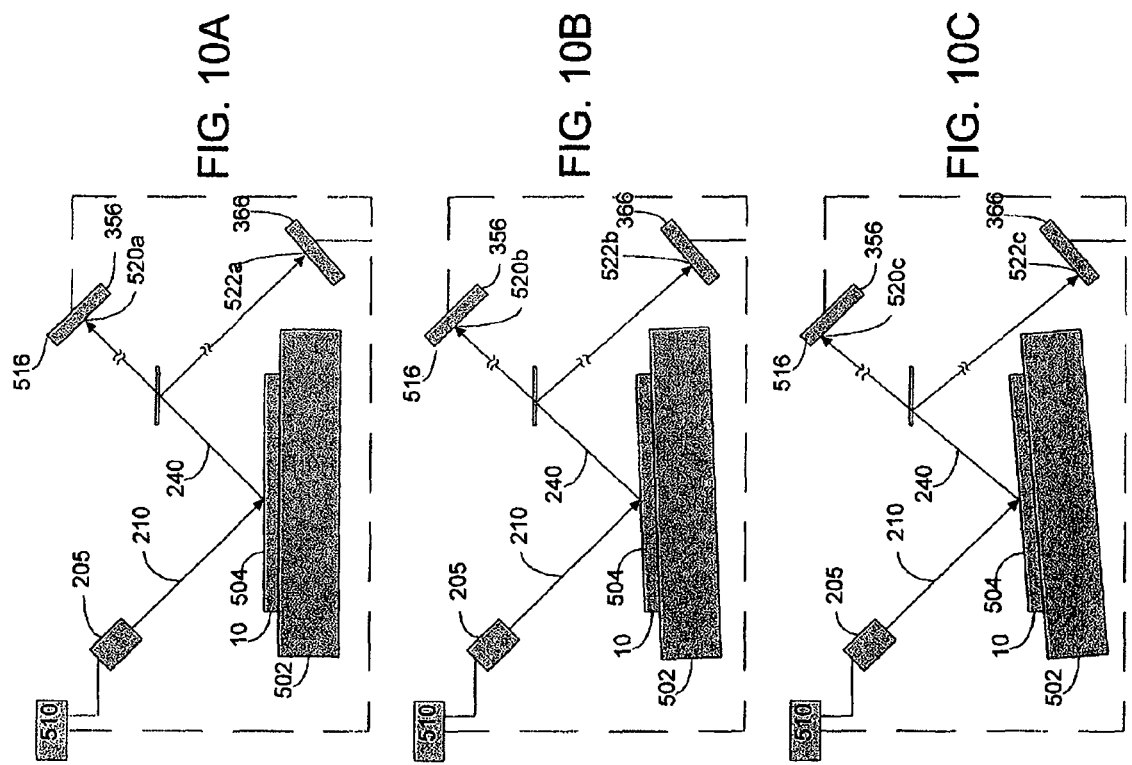
FIGS. 10A-10C illustrate an exemplary calibration process wherein the array surface is positioned in a desired manner relative to the signal acquisition reference frame.

Once the array-reference frame orientation has been established, PSD readings may be acquired at various target orientations, as illustrated in FIGS. 10A-C. FIG. 10A illustrates the first surface 504 in a first orientation, yielding impingement points or areas 520a and 522a from the first and second PSDs 356 and 366, respectively. As previously described, the first and second PSDs 356 and 366 may be in substantially known orientations relative to the reference frame (not shown). Thus, the first and second PSDs' impingement points or areas 520a and 522a correspond to the first orientation of the first surface 504 with respect to the reference frame 106.

FIG. 10B illustrates the first surface 504 in a second orientation, yielding impingement points or areas 520b and 522b from the first and second PSDs 356 and 366, respectively. The transition of the first surface 504 from its first orientation to the second orientation may be achieved by controllably moving the stage with specified precision. An example of a stage suitable for such movement is described below. Thus, the first and second PSDs' impingement points or areas 520b and 522b correspond to the second orientation of the first surface 504 with respect to the reference frame.

FIG. 10C illustrates the first surface 504 in a third orientation, yielding impingement points or areas 520c and 522c from the first and second PSDs 356 and 366, respectively. Thus, the first and second PSDs' impingement points or areas 520c and 522c correspond to the second orientation of the first surface 504 with respect to the reference frame.

Such movements may continue to cover the desired range of movements, with PSD impingement points or areas obtained therefrom corresponding to substantially known orientations of the first surface 504. Although FIGS. 10A-C illustrate a tilt calibration movement, it will be appreciated that such depiction is for illustrative purpose only, and is not meant to limit the scope of the calibration movements. Other stage movements, such as Z-shifts and combination of Z-shift and tilt (in both X and Y) may be performed without departing from the spirit of the present teachings. Additionally, the configuration described above may be modified in a manner generally analogous with the aforementioned positionings and orientations of the previously disclosed positional detection arrangements shown in FIGS. 5-8 above.

In various embodiments, data is collected from the PSDs corresponding to substantially known target surface orientations and such data may be stored and retrieved at later times to allow determination of an unknown target surface orientation based on corresponding PSD values. Such PSD values to target surface orientation determination (based on the calibration data) may be performed in a number of ways, including a matrix based transformation method described below.

Figure 11:
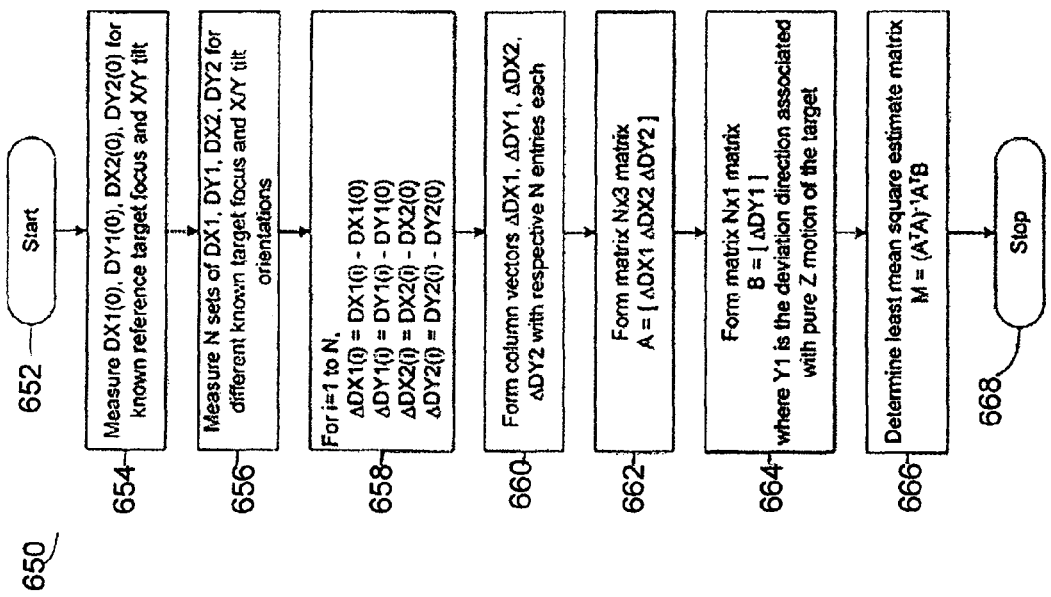
FIG. 11 illustrates a calibration process for associating position sensitive detector responses to various array positions.

FIG. 11 illustrates a process 650 for calibrating the array position based on the positional detection systems described in the various preceding Figures. This process 650 further provides for storing the calibration data to facilitate the transformation of PSD quantities DX1, DY1 (from the first PSD or PSD segment), DX2, DY2 (from the second PSD or second PSD segment) into the target control space quantities $\Delta Z$, $\Delta\theta_X$, $\Delta\theta_Y$. In certain embodiments, the process 650 may be performed once, at a regular interval, or as needed, without departing from the spirit of the present teachings.

The process 650 begins at a start state 652. In state 654 that follows, the process 650 measures the array-reflected emissions at PSD(s), with the array being in a known focus and X/Y tilt. The resulting values DX1(0), DY1(0) are obtained from the first PSD, and DX2(0), DY2(0) are obtained from the second PSD. In state 656 that follows, the process 650 moves the target to N different known Z focus and X/Y tilt orientations. At each orientation, the PSD quantities DX1, DY1, DX2, DY2 are measured and stored. In state 658 that follows, PSD position deviation array is formed for the N measurements as:

$$\Delta DX1(i)=DX1(i)-DX1(0)$$

$$\Delta DY1(i)=DY1(i)-DY1(0)$$

$$\Delta DX2(i)=DX2(i)-DX2(0)$$

$$\Delta DY2(i)=DY2(i)-DY2(0)$$

where i=1 to N. In state 660 that follows, column vectors $\overline{\Delta DX1}$, $\overline{\Delta DY1}$, $\overline{\Delta DX2}$, $\overline{\Delta DY2}$ corresponding to the arrays $\Delta DX1(i)$, $\Delta DY1(i)$, $\Delta DX2(i)$, $\Delta DY2(i)$ are formed. These arrays facilitate formation of a matrix A in state 262 that follows where the column vectors $\overline{\Delta DX1}$, $\overline{\Delta DX2}$, $\overline{\Delta DY2}$ are combined to form a N×3 matrix A=[$\overline{\Delta DX1}$ $\overline{\Delta DX2}$ $\overline{\Delta DY2}$]. The matrix A facilitates formation of a least mean square estimate matrix described below. In state 664 that follows an N×1 matrix B=[$\overline{\Delta DY1}$] is formed. The matrix B also facilitates formation of the least mean square estimate matrix described below.

In various embodiments, the "preferential" treatment of the DY1 quantity may be due to the selection of the Y1 direction being the direction associated with pure Z motion of the target. If a different coordinate system convention system is utilized with a different PSD direction associated with the pure Z target motion, the matrices A and B can be formed accordingly without departing from the spirit of the present teachings. In state 666 that follows, a least mean square estimate matrix M=$(A^T A)^{-1} A^T B$ is formed from the matrices A and B, where $A^T$ represents the transpose of the A matrix and the superscript $(^{-1})$ represent the inverse of a matrix. The matrix M characterizes the coupling of the pure Z target motion (characterized by the selected matrix B) with the X/Y tilt, and is utilized to uncouple a non-calibration measured target position (by the first and second PSDs) into the target control space quantities $\Delta Z$, $\Delta\theta_X$, and $\Delta\theta_Y$ in a manner described below. The calibration process 650 ends at a stop state 668.

The coupling matrix M determined in the foregoing manner allows the transformation of the PSD measured quantities DX1, DY1, DX2, DY2 to be transformed into the target control space quantities $\Delta Z$, $\Delta\theta_X$, and $\Delta\theta_Y$. It will be appreciated that the foregoing matrix based technique is just one possible method of transforming the PSD values to target control space values. Other transformation methodologies may be used without departing from the novel concept of determining the control space deviation quantities from the PSDs' measurements.

Figure 12:
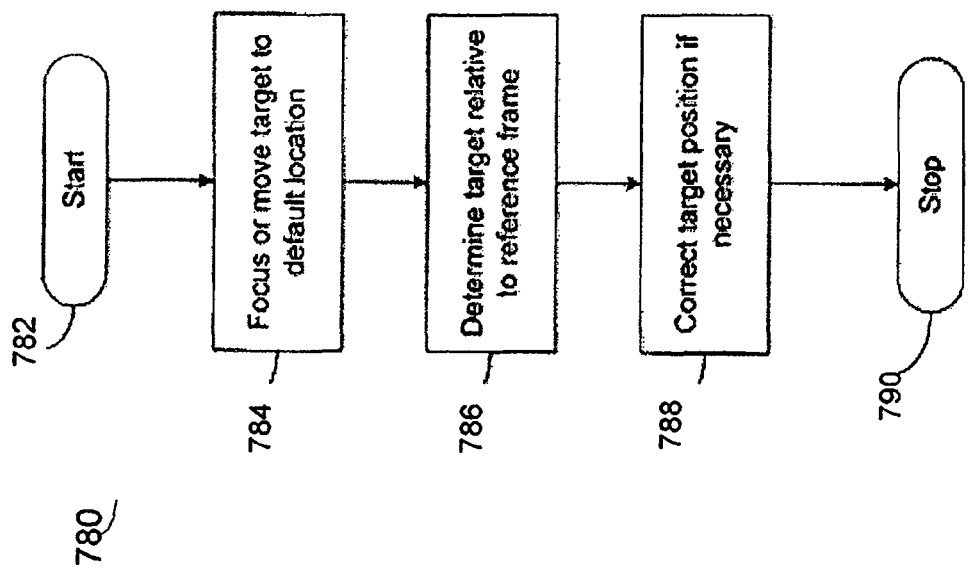
FIG. 12 illustrates an exemplary process for positioning of an array relative to the signal acquisition reference frame.
Figure 13:
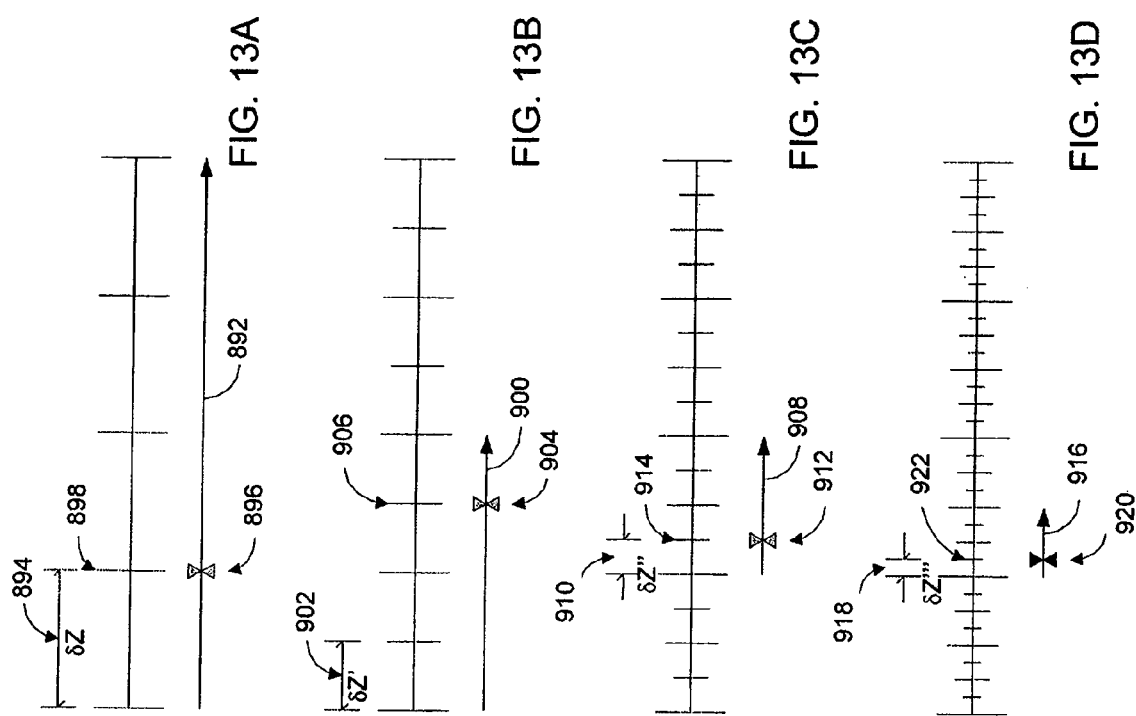
FIGS. 13A-13D illustrate an exemplary process for bringing an array into focus.

With the foregoing description of the array position deviation detection system, and the calibration method that facilitates target or array position deviation determination, use of the detection system during a data taking run is now described in greater detail. FIG. 12 illustrates a generalized process 780 for determining the target or array position relative to the reference frame, and making corrections as needed. The process 780 may be performed at the beginning of a given data taking run, after the array is mounted on a mounting location. In certain embodiments, such mounting process may require re-focusing of the array with respect to the reference frame. In other embodiments, the array may simply need to be verified for proper position with respect to the reference frame.

In certain embodiments, the process 780 is facilitated by the focusing component 110 and the controller 112. The process 780 begins in a start state 782, and in state 184 that follows, the array is focused or moved to a default location with respect to the reference frame. As previously mentioned, in embodiments that do not require focusing after "loading" of arrays, such step may not be necessary. In step 786 that follows, array's position relative to the reference frame is determined. The array position thus determined may include, fine Z position (after focusing), X/Y tilt, and/or the lateral position described above. In step 788 that follows, the array is moved to a correct position based on the position error(s) determined in step 186, and the process 780 ends in a stop state 790.

FIGS. 13A-D illustrate one possible focusing method that may occur in step 184 of the process 180 described above in reference to FIG. 12. The focusing method comprises positioning the array at a default focus location, and moving the array in δZ steps M times to cover a range that includes the current array position. At each δZ step, a focus quality metric is obtained. One possible method of determining the focus quality metric is described below in greater detail. The focusing method is depicted as having M=4 step movements. It will be understood, however, that M=4 is only for the purpose of description and is not intended to limit the method in any manner. Other methods may have more or less number of steps without departing from the spirit of the present teachings.

In FIG. 13A, an arrow 892 depicts the range of Z movements of the array in δZ steps 894, and a first indicator 896 indicates a first Z position 898 having the best focus quality metric for the δZ steps. FIG. 13B illustrates a next set of Z movements of the array in M smaller steps δZ' 202 about the first Z position 898. In one implementation, δZ' is approximately half of δZ. This set of Z movements is depicted as an arrow 900, with a second indicator 904 indicating a second Z position 906 having the best focus quality metric for the δZ' steps. FIG. 13C illustrates a continuation of the focusing method, wherein an arrow 908 indicates a set of Z movements in M δZ'' 210 (δZ''=½ δZ') steps to yield a third best focus quality metric Z position 914 indicated by a third indicator 912.

The process of successively making the step size smaller continues until the step size becomes smaller than a predetermined value. FIG. 13D is a continuation of the movement set of FIG. 13C, wherein an arrow 916 indicates a set of Z movements in M δZ''' 918 (δZ'''=½ δZ'') steps to yield a fourth best focus quality metric Z position 922 indicated by a fourth indicator 920. In this exemplary focusing process the step size δZ''' is less than the predetermined value; thus, the Z position 922 represents the "focused" position of the array. In certain embodiments, the predetermined value is set at approximately 0.3 μm, but it will be understood that such threshold value depends on the specific instrument and/or application, and may vary without departing from the spirit of the present teachings.

In certain embodiments, the focus quality metric is determined by evaluating a contrast value (CV) of an array image at the reference frame. As generally known, "autofocusing" may be achieved by an iteration of steps where in each step, some value associated with the quality of focus is determined. The "best" value among the values associated with the various steps may then represent the best focus for such step size focus movements. If the reference frame is a CCD having a selected center section with N pixels, one possible way of determining the focus related values is to evaluate the contrasts of the pixels with respect to some reference values. For example, contrast value CV can be evaluated as $$CV = \frac{1}{E(x_i)}\sqrt{\frac{1}{N}\sum_{i=1}^{N}(x_i - E(x_i))^2} \quad (1)$$

where $x_i$ is i-th pixel intensity and $E(x_i)$ is the mean pixel intensity for the i-th pixel. The CV is evaluated at each Z position of a given set of focus movements, and the position with the highest CV value is designated as the focus point for the given set of movements.

Figure 14:
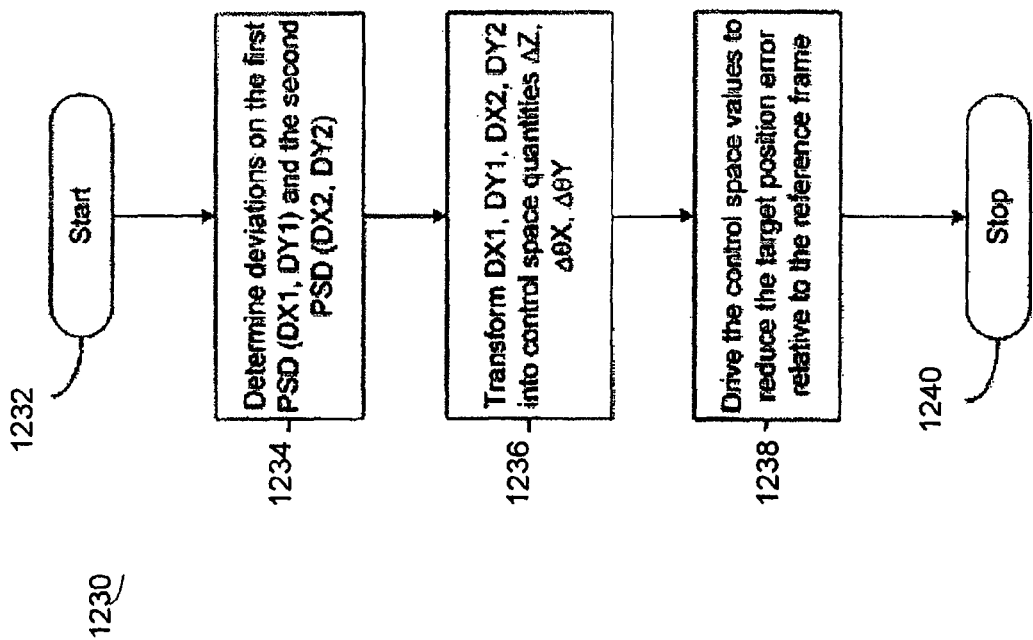
FIG. 14 illustrates a process for reducing array positioning error relative to the signal acquisition reference frame.

FIG. 14 illustrates a process 1230 that elaborates the steps 786 and 788 (array position determination and correction) of the overall process 780 described above in reference to FIG. 12. At the beginning of the process 1230 in state 1232, the array has been positioned at a default location or focused by a method such as that described above in reference to FIG. 13. In state 1234, the process 1230 determines deviations of the array-reflected light at the first and second PSDs as quantities DX1, DY1, and DX2, DY2 from the respective PSD's reference point corresponding to the optimal array position. In step 1236 that follows, the measured quantities DX1, DY1, DX2, DY2 from the PSDs are transformed into array control space quantities $\Delta Z$, $\Delta\theta_X$, and $\Delta\theta_Y$ in a manner described below in greater detail. In step 1238 that follows, the process 1230 drives the array control space values $\Delta Z$, $\Delta\theta_X$, and $\Delta\theta_Y$ to reduce the array position error relative to the reference frame. The process 1280 ends at a stop state 1240.

Figure 15:
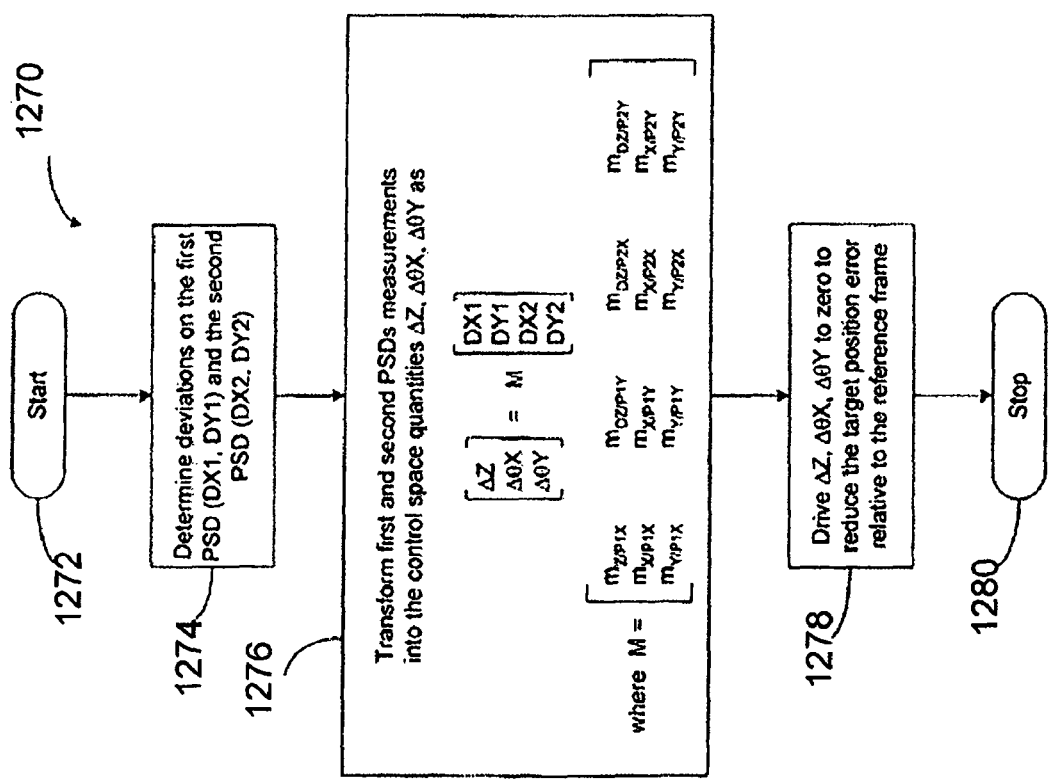
FIG. 15 illustrates a process for transforming position sensitive detector data into array control space information to be used in array positioning.

FIG. 15 illustrates a process 1270 that elaborates on the transformation step 1236 of the process 1230 described above in reference to FIG. 14. The process 1270 begins at a start state 272. In state 274 that follows, the deviations in the hit locations of the array reflected light at the first and second PSDs are determined as DX1, DY1 (for the first PSD), and DX2, DY2 (for the second PSD). In state 1276 that follows, the four quantities DX1, DY1, DX2, DY2 are formed into a 4-element column vector, and transformed into a 3-element array control space column vector as $$\begin{bmatrix} \Delta Z \\ \Delta\theta_x \\ \Delta\theta_y \end{bmatrix} = M \begin{bmatrix} DX1 \\ DY1 \\ DX2 \\ DY2 \end{bmatrix} \quad (2)$$

where the M matrix is obtained from the calibration process 650 described above in reference to FIG. 11. Specifically, $$M = \begin{bmatrix} m_{Z/P1X} & m_{DZ/P1Y} & m_{DZ/P2X} & m_{DZ/P2Y} \\ m_{X/P1X} & m_{X/P1Y} & m_{X/P2X} & m_{X/P2Y} \\ m_{Y/P1X} & m_{Y/P1Y} & m_{Y/P2X} & m_{Y/P2Y} \end{bmatrix}$$

where the subscripts denote the coupling between the array coordinate variable on the left of the "/" symbol and the PSD coordinate variable on the right side of the "/."

The actual values of the matrix M elements m of course depend on the actual geometry of the reflected light and the positions of the PSDs with respect to the array. The geometry not only determines the coupling of between the array control space quantities $\Delta Z$, $\Delta\theta_X$, and $\Delta\theta_Y$, but also the coupling in the detected values from the two PSDs for a given array deviation mode. That is, the $\Delta Z$, $\Delta\theta_X$, $\Delta\theta_Y$ deviations of the array result in the PSD detected deviations to be coupled by certain amounts. These PSD-to-PSD coupling values can be determined as follows:

$$Coupling_Z = A_{Norm}\sqrt{\frac{m_{DZ/P2X}^2 + m_{DZ/P2Y}^2}{m_{DZ/P1X}^2 + m_{DZ/P1Y}^2}}$$

$$Coupling_{\Delta\theta_X} = A_{Norm}\sqrt{\frac{m_{DX/P1X}^2 + m_{DX/P1Y}^2}{m_{DX/P2X}^2 + m_{DX/P2Y}^2}}$$

$$Coupling_{\Delta\theta_Y} = A_{Norm}\sqrt{\frac{m_{DY/P1X}^2 + m_{DY/P1Y}^2}{m_{DY/P2X}^2 + m_{DY/P2Y}^2}}$$

where $A_{norm}$ is a normalization constant.

Once the array control space quantities $\Delta Z$, $\Delta\theta_X$, and $\Delta\theta_Y$ are determined in the foregoing manner, the process 1270 in state 1278 drives these variables to zero to reduce the array position error relative to the reference frame. The process ends at a stop state 1280.

The array control space quantities $\Delta Z$, $\Delta\theta_X$, and $\Delta\theta_Y$ determined in the foregoing manner describes the Z and X/Y tilt offsets of the array from its optimal position with respect to the reference frame. Given such information, the optical system may be adapted to move the array so as to drive these quantities to zero, thereby facilitating the improved positioning of the array with respect to the reference frame.

Figure 16:
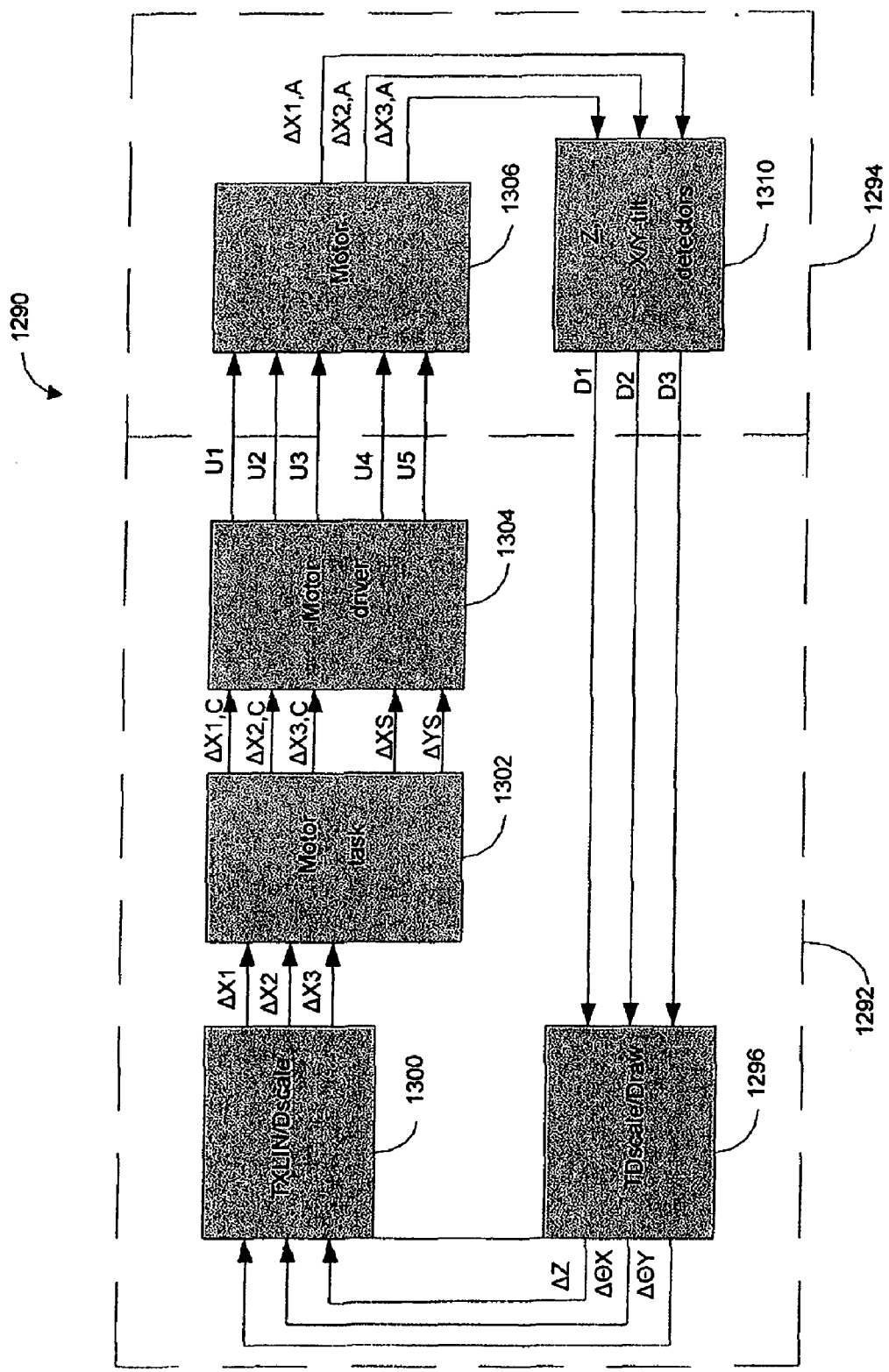
FIG. 16 illustrates a functional block diagram of an array control space loop that reduces array position error relative to the signal acquisition reference frame.

Once the array control space quantities $\Delta Z$, $\Delta\theta_X$, and $\Delta\theta_Y$ are determined, for example, in the manner described above in reference to FIGS. 14 and 15, such quantities may be utilized to correct the array position with respect to the reference frame. One possible system and method for achieving such correction is illustrated in FIG. 16 that depicts a functional block diagram of an array position control system 1290. In certain embodiments, the control system 1290 is configured to detect the array offset and drive the array to reduce the offset, thereby improving the position of the array. In certain embodiments, the array position control system 1290 comprises a firmware portion 1292 and a hardware portion 1294.

The description of the feedback control system 1290 begins at the hardware portion 1294 at Z, X/Y-tilt PSDs 1310 that function as described above. The PSDs output detected signals D1, D2, D3 that are input into a first transformer 1296. The first transformer 1296 transforms the PSD signals D1, D2, D3 into the array control space signals $\Delta Z$, $\Delta\theta_X$, and $\Delta\theta_Y$. The array control space signals $\Delta Z$, $\Delta\theta_X$, and $\Delta\theta_Y$ are input into a second transformer 1300 that transforms the input signals into signals $\Delta X_1$, $\Delta X_2$, $\Delta X_3$ adapted for a motor tasker 1302. The motor tasker 1302 determines the array movement(s) to be made based on its input signals $\Delta X_1$, $\Delta X_2$, $\Delta X_3$, and outputs signals $\Delta X_{1C}$, $\Delta X_{2C}$, $\Delta X_{3C}$, and $\Delta X_S$, $\Delta Y_S$ adapted for a motor driver 1304. The motor tasker output signals includes the array position correction signals $\Delta X_{1C}$, $\Delta X_{2C}$, $\Delta X_{3C}$, as well as the lateral stage movement signals $\Delta X_S$, $\Delta Y_S$ to center the array relative to the reference frame. The motor driver 1304 transforms the motor tasker 1302 signals $\Delta X_{1C}$, $\Delta X_{2C}$, $\Delta X_{3C}$, $\Delta X_S$, $\Delta Y_S$ into their motor-compatible signals $U_1$, $U_2$, $U_3$, $U_4$, $U_5$. The motor-compatible signals $U_1$, $U_2$, $U_3$, $U_4$, $U_5$ cause a motor 1306 to move the array, causing a new set of array position deviation values $\Delta X_{1A}$, $\Delta X_{2A}$, $\Delta X_{3A}$ to be generated and detected by the Z, X/Y-tilt PSDs 1310. Such a feedback control loop may be repeated as necessary to reduce the deviation values $\Delta Z$, $\Delta\theta_X$, and $\Delta\theta_Y$ to acceptable levels.

Figure 17B:
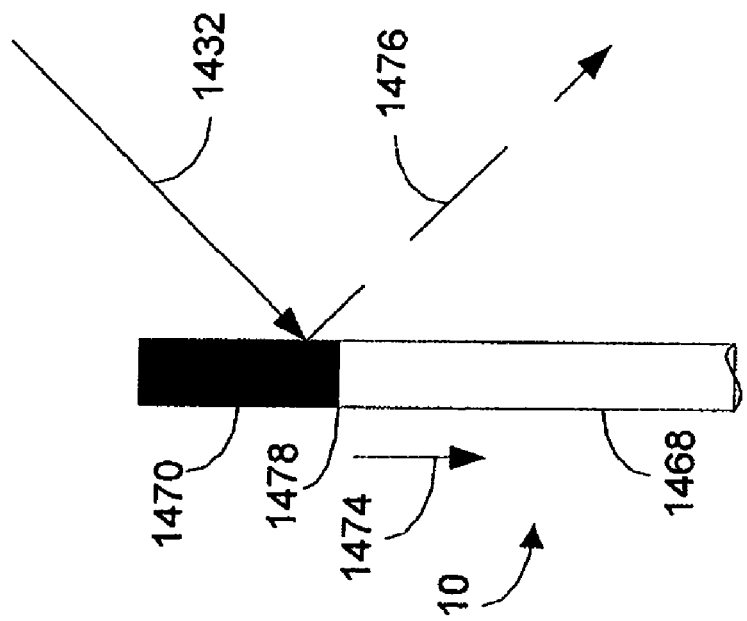
FIGS. 17A-17B illustrate a method utilizing signal reflection to detect an array or feature edge.
Figure 17A:
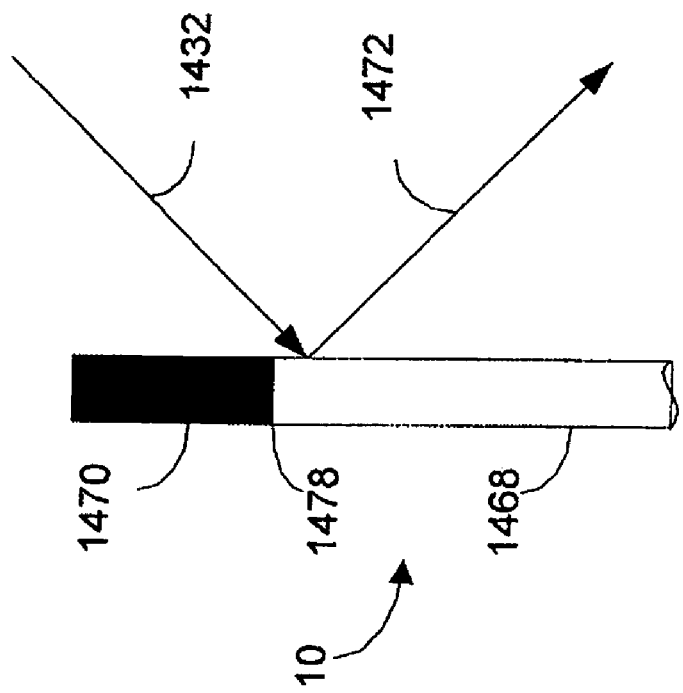

In one aspect, the present teachings also relates to an array position deviation detection system that allows the array to be positioned at an optimal lateral position ("centered") with respect to the signal acquisition frame. In certain embodiments, the centering is achieved by detecting the edges of the array, as illustrated in FIGS. 13A and B. In the expanded side view, the array 10 is depicted to include an active portion 1468 bounded by a border 1470 so as do define an edge 1478 therebetween. FIGS. 17A,B illustrate a transition of the incidence point of the incident light 1432 from the active portion 1468 to the border 1470 as the array 10 is moved laterally as indicated by an arrow 1474. While the incident light 1432 impinges on the active portion 1468 of the array 10 as in FIG. 17A, a specularly reflected light 1472 has one or more properties associated with reflection from the active portion's surface. When the incident light impinges on the border 1470 of the array as in FIG. 17B, a specularly reflected light 1476 has one or more properties associated with reflection from the border surface. For example, if the active portion surface is more reflective than the border surface, the reflected light 1472 has a higher intensity than the reflected light 1476. In another example, if the border surface is less smooth than the active portion surface, the reflected light 1476 may have a wider beam profile (diffused) than that of the reflected light 1472.

In certain embodiments, the reflected lights 1472 and 1476 are detected and measured by one or both of the two PSDs described above. The PSDs may be configured to detect changes in the intensity of the reflected light. The diffused reflected light, if diffused more than the PSD element dimension, may be detected by a plurality of elements of the PSD(s). In such a measurement, the presence of diffused beam may be sufficient to indicate the transition of the reflecting surface.

Figure 18:
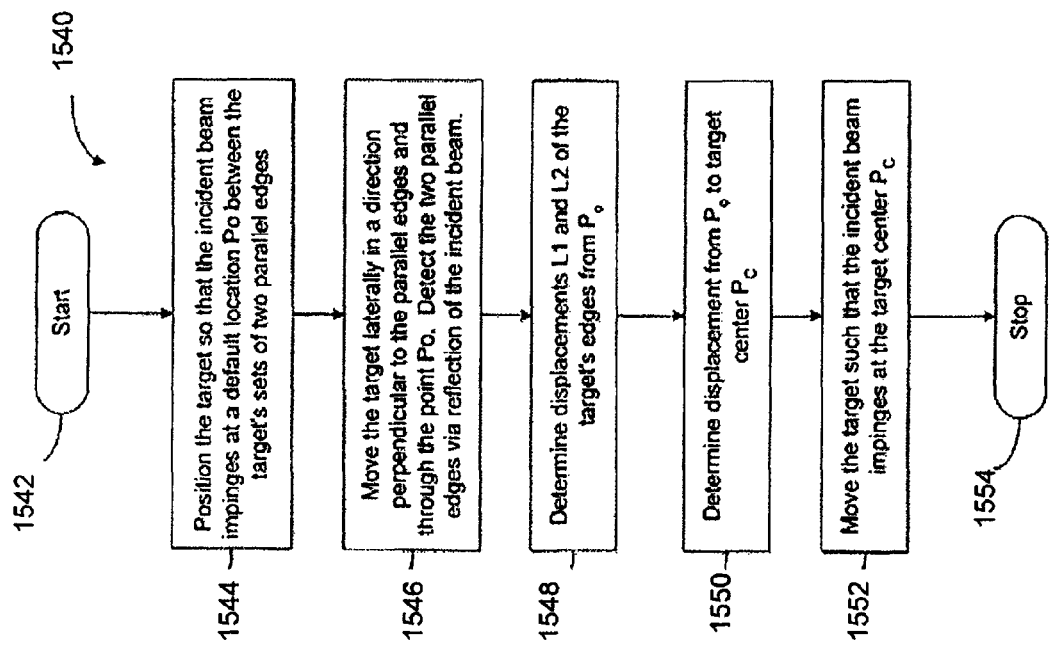
FIG. 18 illustrates a process for array or feature centering with respect to a signal acquisition reference frame.

FIGS. 18 and 19 illustrate one possible method of positioning the array at a desirable lateral position with respect to the reference frame. In certain embodiments, the desirable lateral position comprises centering the array with respect to the reference frame. An array centering process 1540 describes centering of an array along a single lateral direction. As seen in FIGS. 19A, B, an array may have exemplary shapes such as a rectangle or a hexagon. It will be appreciated that the centering concept and implementation may be extended to include centering along other directions to accommodate centering of various array shapes without departing from the spirit of the present teachings.

An array centering process 1540 begins at a start state 1542, and in state 1544 that follows, the process positions the array so that the incident beam of light impinges at a default location $P_o$ somewhere between the array's sets of parallel edges. In state 1546 that follows, the array is moved in a direction perpendicular to the parallel edges and through the location $P_o$. As the array is moved laterally, the array-reflected light is monitored by one or more of the PSDs to detect the two parallel edges. In state 1548 that follows, the process 1540 determines displacements L1 and L2 of the two parallel edges from the location $P_o$. In state 1550 that follows, the process 1540 determines the displacement from the location $P_o$ to the array center $P_C$ determined from L1 and L2. In certain implementations, the displacement magnitude $|P_o-P_C|$ may be determined by evaluating $\frac{1}{2}|L1-L2|$. The direction of displacement is towards the side of larger of L1 and L2. In state 1552 that follows, the array is moved by the displacement determined in step 1550 such that the incident light beam impinges at the array center $P_C$. The process 1540 ends at a stop state 1554.

The centering process 1540 described in reference to FIG. 18 may be applied to the exemplary array shapes illustrated in FIGS. 19A and B. A rectangular array 1660 comprises two sets of parallel edges 1676, 1680, and 1670, 1672. Point $P_o$ is indicated as 1662, and $P_C$ as 1664. Moving the array 1660 such that the incident light beam impinges along a line 1674 allows detection of edges 1676 and 1680 in a manner described above. Such detection allows determination and corrective move of a displacement 1684 that moves the incident light beam impinging point from $P_o$ to $P_C$ along the line 1674. In a similar manner, the center of the array with respect to the edges 1670 and 1672 is determined so as to move the impinging point by a displacement 1682 along a line 1666.

FIG. 19B illustrates a hexagonal shaped array 1690 having three sets of parallel edges 1700, 1702; 1706, 1710; 1714, 1716. Point $P_o$ is indicated as 1692, and $P_C$ as 1694. Moving the array 1690 such that the light beam's incident point moves along a line 1696 allows detection of the edges 1700 and 1702, thereby allowing determination of a displacement 1720 from $P_o$ to $P_C$ along the line 1696. Similarly, the displacements 1724 and 1722 along lines 1704 and 1712, respectively, are determined.

It will be appreciated that the foregoing method of centering the array can be applied to other array shapes without departing from the spirit of the present teachings. Preferably, the array shape has symmetry and sets of parallel edges. However, any other array shapes without symmetry and/or parallel edges may also be adapted so as to allow centering in the foregoing manner. For example, the active portion of the array may not be symmetric or have parallel edges. Such an array may be mounted on a symmetric array holder having parallel edges, and such array holder may be mounted on the stage. By knowing the spatial relationship between the array and the array holder, the above described centering technique may be utilized in centering the array with respect to the reference frame.

Figure 20:
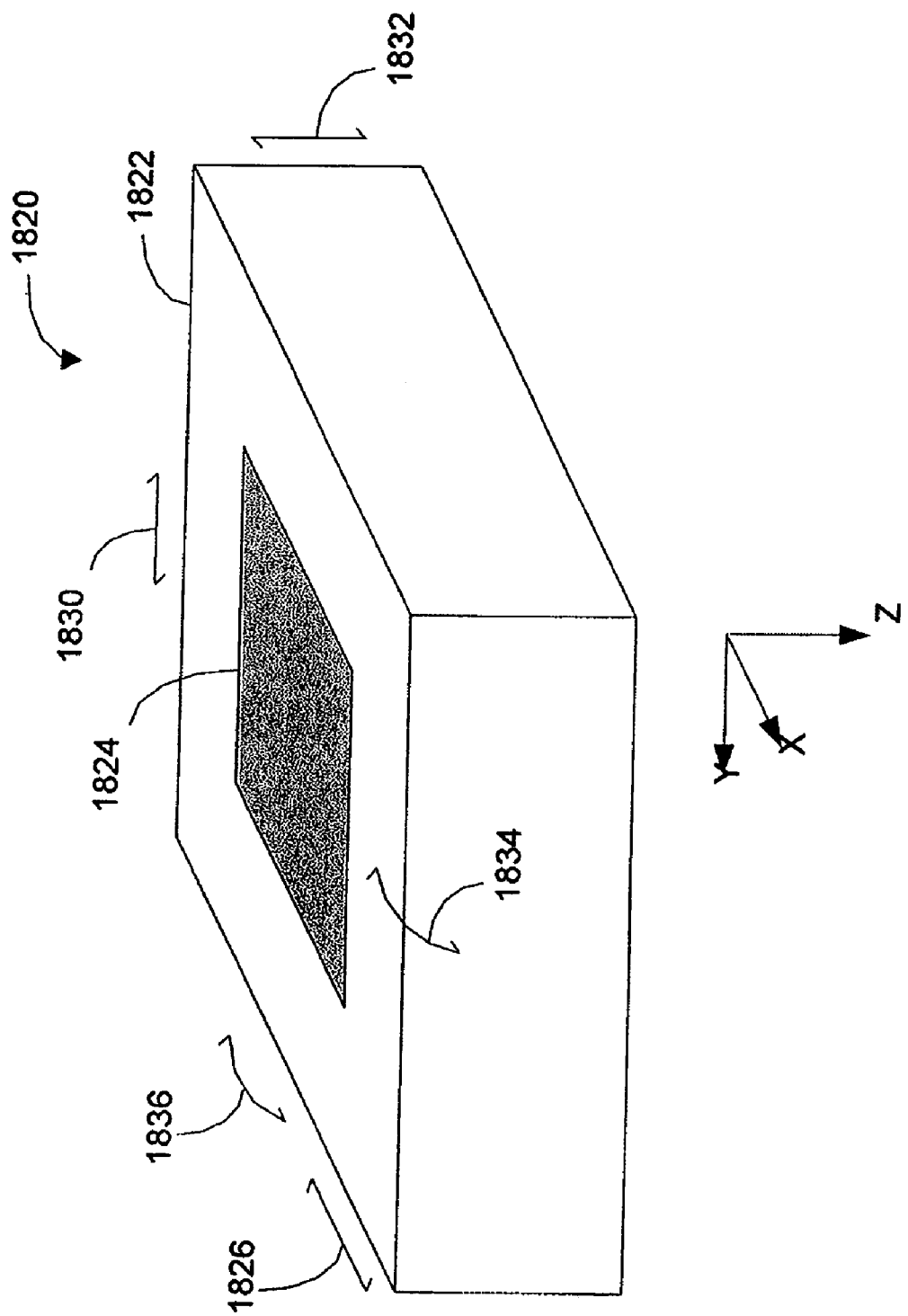
FIG. 20 illustrates an exemplary stage assembly having an array mounted thereon that allows positioning of the array relative to the signal acquisition reference frame.

The array position movements determined and actuated in the foregoing manner may be implemented by a stage assembly 1820 illustrated in FIG. 20. The stage assembly 1820 comprises a stage 1822 and an array 1824 mounted thereon. The stage 1822 can be adapted to be moved along a Z-direction 1832, laterally along X and Y directions 1826 and 1830. The stage 1822 may also be adapted to be tilted so as to cause an X-axis tilt 1834 and a Y-axis tilt 1836.

Although the above-disclosed embodiments of the present invention have shown, described, and pointed out the fundamental novel features of the invention as applied to the above-disclosed embodiments, it should be understood that various omissions substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. An optical system for positional assessment of a target array, the system comprising:
   a target array comprising a plurality of features configured to produce signals when exposed to a sample;
   an imaging device configured to acquire signals emitted by the features and to identify a composition of the sample;
   an emissions source configured to direct emissions onto the target array which are subsequently reflected from the target array;
   a reflective element configured to receive emissions from the emissions source that are reflected off the target array and to direct the emissions back onto the target array;
   a detector that outputs a position signal based at least in part on emissions from the emissions source that travel along an optical path defined, in order, from the emissions source to the target array, from the target array to the reflective element, from the reflective element to the target array, and then from the target array to the detector; and
   a controller configured to monitor the position signal.

2. The system of claim 1, further comprising a positional adjustment mechanism in communication with the controller, wherein the positional adjustment mechanism moves the target array by a determined distance to approximately center the target array with respect to the detected boundaries.

3. The system of claim 2, wherein the of the target array improves the resolution of the signals emitted by the features.

4. The system of claim 2, wherein the positional adjustment mechanism comprises a stage upon which the target array resides, the stage further adapted to be moved laterally along two orthogonal axes.

5. The system of claim 1, wherein sample comprises a plurality of particles and the target array comprises a fiber bundle with each fiber having a tip adapted to attract a specific type of particle of the plurality of particles.

6. The system of claim 5, wherein the specific type of particles attracted by the target array comprise nucleotide or protein molecules.

7. The system of claim 6, wherein the specific type of particles are labeled with chemical markers that emit a signal when subjected to an excitation source.

8. The system of claim 1, wherein the detector senses changes in the intensity of the reflected emissions to allow determination of a boundary delineating between first and second coplanar reflecting surfaces of the target array on the basis of a change in the reflected emissions intensity as an incidence point on the target array transitions between the first and second coplanar reflecting surfaces of the target array.

9. The system of claim 8, wherein the detector comprises at least one position sensitive detector configured to detect the dispersion of the reflected emissions thereby allowing determination of the boundary based at least in part upon a change in the reflected emission's dispersion.

10. The system of claim 1, wherein the reflective element comprises a curved reflective surface that reflects emissions reflected from the target array.

11. The system of claim 1, wherein the emissions source comprises a laser.

12. The system of claim 1, wherein the feature comprises a plurality of nucleotide probes.

13. The system of claim 1, wherein signals comprise fluorescent or visible light of various wavelengths.

14. The system of claim 1, wherein the controller is configured to provide, based at least in part on the position signal, one or more of a lateral position of the target array and an angular position of the target array.

15. The system of claim 1, wherein the target array is configured to move with respect to the emissions source such that the emissions translate from an initial incidence point on the target array to another incidence point on the target array.

16. The system of claim 1, wherein the target array further comprises a first coplanar reflecting surface and a second coplanar reflecting surface, the surfaces delineated by a boundary, the plurality of features are arranged in a selected orientation with respect to the boundary, wherein the controller is configured to distinguish between when the position signal corresponds to the first coplanar reflecting surface and when the position signal corresponds to the second coplanar reflecting surface.

17. A system for interrogating a sample, the system comprising:
- a probe array configured to be responsive to a plurality of particles wherein the probe array generates one or more identifiable signals following interaction with the sample particles;
- an imaging device capable of identifying signals associated with the constituent probes of the probe array wherein the position of each constituent probe and the signal arising therefrom is used to identify the presence or absence of particles contained within the sample;
- a focusing component that positions the imaging device and the probe array with respect to each other so as to obtain a selected orientation between the imaging device and the probe array; and
- a focus detection system that includes at least one detector wherein the focus detection system directs source emissions from an emissions source towards the probe array which are reflected with an orientation dependent on the positioning of the array and wherein the reflected emissions subsequently impinge upon the at least one detector;
- the at least one detector configured to detect offsets between the impingement positions of the reflected emissions on the detector with respect to a preselected location on the detector in at least two dimensions, the pre-selected location indicative of a desired focal orientation of the imaging device and the probe array;
- wherein the focus detection system uses the at least two dimensional offsets of the impingement position to determine how to move the imaging device and the probe array with respect to each other in order to position the imaging device and the probe array in the desired focal orientation; and
- wherein the detected offsets are based at least in part on source emissions from the emissions source that travel along an optical path defined, in order, from the emissions source to the probe array, from the probe array to a reflective element, from the reflective element to the probe array, and then from the probe array to the at least one detector.

18. The system of claim 17, wherein the selected focal orientation improves the ability of the processing system to determine the physical location on the probe array from which each signal originates.

19. The system of claim 17, wherein the selected focal orientation between the imaging device and the probe array is defined by at least the characteristics of (i) the deviation in the distance between the probe array and the imaging device ($\Delta Z$), (ii) the tilt angle about a first axis $\theta_X$ and (iii) the tilt angle about a second axis $\theta_Y$.

20. The system of claim 19, wherein the focusing component adjusts the focal orientation between the imaging device and the probe array such that the deviation in the distance between the probe array and the imaging device ($\Delta Z$) is less than a pre-selected deviation and such that the tilt angle about the first and second axes $\theta_X$ and $\theta_Y$ achieve preselected values.

21. The system of claim 19, wherein the at least one detector comprises a first and a second detector upon which the source emissions may impinge in a specified orientation when the probe array and the imaging device are in the selected orientation and wherein each of the first and second detectors provide a measure of the offset between the actual point of impingement of the reflected emissions on the first and second detectors and pre-selected locations on the first and second detectors indicative of the selected orientation.

22. The system of claim 21, wherein the dimensional coordinates are mathematically transformed using a calibration data set to define the values $\Delta Z$, $\theta_X$ and $\theta_Y$.

23. The system of claim 22, wherein the mathematical transformation is performed by a least mean square estimate matrix that operates on a given set of dimensional coordinates to yield estimates of corresponding $\Delta Z$, $\theta_X$ and $\theta_Y$ values.

24. The system of claim 22, wherein the calibration data set comprises data points corresponding to dimensional coordinates obtained when the probe array is positioned at known $\Delta Z$, $\theta_X$ and $\theta_Y$ focal orientations.

25. An optical system comprising:
- an analysis platform comprising a sample disposed on a probe array wherein each probe is configured to be responsive to a specific particle and wherein when the probe array is exposed to the sample, the probes generate identifiable signals based on the interaction of the probes with specific particles within the sample;
- an image capture device that captures an image of the probe array so as to be able to identify the position of the signal generating probes to thereby identify the composition of specific particles contained within the sample;
- a focusing component that positions the image capture device and the analysis platform with respect to each other so as to obtain a desired focal orientation between the image capture device and the analysis platform;
- a focus detection system that includes a calibration data set and a plurality of detectors different than the image capture device wherein the focus detection system directs an energy beam towards the array of probes which is then reflected with an orientation dependent on the positioning of the array and wherein the reflected energy beam is split into a plurality of reflected beams which impinge upon the plurality of detectors;
- the plurality of detectors configured to detect offsets of the impingement positions of the plurality of reflected beams on the detectors with respect to pre-selected locations on the detectors in at least two dimensions, the pre-selected locations indicative of the desired focal orientation of the image capture device and the analysis platform;
- wherein the focus detection system uses the at least two dimensional offsets of the impingement positions of the reflected beams and the calibration data to determine how the focusing component must relatively move the image capture device and the analysis platform with respect to each other in order to relatively position the image capture device and the analysis platform in the desired focal orientation; and a processing system that evaluates the image captured by the image capture device when the analysis platform and the image capture device are in the desired focal orientation wherein the desired focal orientation is selected to improve the ability of the processing system to determine the physical location on the array of probes of the generated signals to thereby permit identification of the particle composition in the sample based upon the location of signals detected in the probe array;

wherein the detected offsets are based at least in part on emissions from an emissions source that travel along an optical path defined, in order, from the emissions source to the analysis platform, from the analysis platform to a reflective element, from the reflective element to the analysis platform, and then from the analysis platform to the plurality of detectors.

26. The system of claim 25, wherein the probe array comprises a plurality of host sites adapted to selectively interact with a selected type of particle such that the spatial arrangement of the host sites allows spatial separation of particles from a mixture of different particles, wherein the host sites are approximately coplanar such that host sites define a reflecting surface for the energy beam.

27. The system of claim 26, wherein the particles are of nucleotide or protein origin.

28. The system of claim 26, wherein each host site comprises a fiber tip such that the probe array is formed by a bundle of the fibers with the tips being approximately coplanar with each other.

29. The system of claim 25, wherein the desired focal orientation between the image capture device and the analysis platform is defined by at least the characteristics of (i) the deviation in the distance between the analysis platform and the image capture device ($\Delta Z$), (ii) the tilt angle about a first axis $\theta_X$ and (iii) the tilt angle about a second axis $\theta_Y$.

30. The system of claim 29, wherein the focusing component adjusts the focal orientation between the image capture device and the analysis platform such that the deviation in the distance between the analysis platform and the image capture device ($\Delta Z$) is less than a pre-selected deviation in the distance and such that the tilt angle about the first and second axes $\theta_X$ and $\theta_Y$ are such that the plane of the analysis platform is substantially parallel to a plane defined by the image capture device.

31. The system of claim 30, wherein the plurality of detectors comprise a first and a second two dimensional detectors wherein each of the first and second detectors have a pre-selected location where the reflected energy beams will impinge when the analysis platform and the image capture device is in the desired orientation and wherein each of the first and second detectors provide a measure of the offset between the actual point of impingement of the reflected beams on the first and second detectors and the pre-selected locations on the first and second detectors respectively.

32. A system, comprising:
a probe array comprising a plurality of features disposed on a substrate surface wherein each feature is configured to generate signals in response to exposure to selected particles contained within a sample;
an imaging device that captures an image of the probe array whereby the image identifies the relative position of features that emit a signal in response to exposure to the selected particles;
a focusing component that positions the imaging device and the probe array with respect to each other so as to obtain a desired focal orientation between the imaging device and the probe array;
a focus detection system comprising:
a source that directs a calibration beam towards the probe array which is subsequently reflected with an orientation dependent on the positioning of the probe array;
a splitter configured to split the reflected calibration beam into a plurality of reflected beams;
a plurality of detectors positioned such that the reflected beams impinge upon a detection surface of each of the plurality of detectors, wherein the detectors are configured so as to detect offsets between the impingement positions of the plurality of reflected beams and pre-selected locations on the detection surfaces of the plurality of detectors in at least two dimensions the pre-selected locations indicative of the desired focal orientation of the imaging device and the probe array; and
wherein the focus detection system uses the at least two dimensional offsets of the impingement positions to determine how the focusing system should position the imaging device and the probe array relative to each other in order to position the imaging device and the probe array in the desired focal orientation; and
a position correction component comprising a feedback component and a driver component wherein the feedback component receives positioning information from the focus detection system regarding the current position of the imaging device with respect to the probe array and wherein the feedback component directs the driver component to induce the movement of the probe array with respect to the imaging device to achieve the desired focal orientation;
wherein the detected offsets are based at least in part on emissions from an emissions source that travel along an optical path defined, in order, from the emissions source to the probe array, from the probe array to a reflective element, from the reflective element to the probe array, and then from the probe array to the plurality of detectors.

33. The system of claim 32, wherein the position correction component induces a desired position and orientation of the probe array with respect to the imaging device to facilitate association of each signal with the corresponding feature from which the signal arose.

34. The system of claim 33, wherein when a desired position and orientation of the probe array with respect to the imaging device is achieved, the signals associated with each feature may be resolved to identify a particulate composition based upon identification of the features from which signals are detected.

35. The system of claim 32, wherein the position correction mechanism comprises a motor which is responsive to driver component direction and adapted to position the probe array with respect to the imaging device according to driver direction so as to achieve the desired position and orientation.

36. The system of claim 35, wherein the driver component comprises a motor driver that provides motor control instructions to effectuate relative movement of the probe array.

37. The system of claim 35, wherein the driver component comprises a motor driver that provides motor control instructions to effectuate relative movement of the imaging component.

38. The system of claim 35, wherein the driver component further comprises a motor tasker that provides a motor driver input signal in response to feedback signals generated by the feedback component.

39. The system of claim 38, wherein the feedback component comprises functionality to transform the impingement positions of the plurality of reflected beams into a motor driver signal that is capable of directing the motor to achieve the desired position and orientation of the probe array with respect to the imaging device.

40. The system of claim 32, wherein the probe array comprises a fiber bundle with each feature comprising a fiber tip adapted to interact with a selected type of particle whereupon a signal is generated that is detectable by the imaging device.

41. The system of claim 40, wherein the selected type of particle comprises a nucleotide or protein molecule.

42. The system of claim 32, wherein the calibration beam comprises an infrared laser beam.

43. The system of claim 32, wherein each of the plurality of detectors comprise a photosensitive detector or CCD element.

* * * * *